(12) United States Patent
McClendon

(10) Patent No.: US 11,994,753 B1
(45) Date of Patent: May 28, 2024

(54) MODULAR FRAME SYSTEM FOR GLASSES

(71) Applicant: Asar McClendon, Atlanta, GA (US)

(72) Inventor: Asar McClendon, Atlanta, GA (US)

( * ) Notice: Subject to any disclaimer, the term of this patent is extended or adjusted under 35 U.S.C. 154(b) by 0 days.

(21) Appl. No.: 18/390,145

(22) Filed: Dec. 20, 2023

(51) Int. Cl.
*G02C 5/22* (2006.01)
(52) U.S. Cl.
CPC ..................................... *G02C 5/22* (2013.01)
(58) Field of Classification Search
CPC . G02C 5/146; G02C 5/22; G02C 5/02; G02C 5/008; G02C 5/16; G02C 5/2218; G02C 9/04; G02C 2200/08; G02B 27/0176; G02B 2027/0178
See application file for complete search history.

(56) References Cited

U.S. PATENT DOCUMENTS

| | | | | |
|---|---|---|---|---|
| 7,712,894 B2 * | 5/2010 | Tsai | .......................... | G02C 5/22 |
| | | | | 351/116 |
| 10,613,336 B2 * | 4/2020 | Urbach | .................. | G09G 3/001 |
| 10,690,937 B1 * | 6/2020 | Law | .......................... | G02C 5/22 |
| 2009/0279047 A1 * | 11/2009 | Tsai | .......................... | G02C 1/08 |
| | | | | 351/153 |
| 2015/0055079 A1 * | 2/2015 | Holzer | ................. | G02C 5/2218 |
| | | | | 351/86 |
| 2016/0124244 A1 * | 5/2016 | Marcoiu | ............... | G02C 5/2254 |
| | | | | 351/153 |
| 2020/0292843 A1 * | 9/2020 | Villalpando | ............ | G06F 1/163 |

\* cited by examiner

*Primary Examiner* — Mustak Choudhury

(57) ABSTRACT

A modular frame system for glasses includes a frame with a first eye portion on a first side and a second eye portion on a second side. Interposed between the first eye portion and the second eye portion may be a nasal bridge section that couples the first eye portion to the second eye portion. Positioned in the first eye portion may be a first lens and the second eye portion may be a second lens. On a first lateral edge of the first eye portion may be a first protrusion. On a second lateral edge of the second eye portion may be a second protrusion. A coupling system may interact with the first and second protrusions so as to allow a user to quickly change frame arms, bands, etc.

18 Claims, 25 Drawing Sheets

MODULAR FRAME SYSTEM FOR GLASSES

CROSS-REFERENCE TO RELATED APPLICATIONS

Not applicable.

TECHNICAL FIELD

The present disclosure relates to a frame system for glasses. More particularly, the present disclosure relates to a modular glasses system that provide a user with different, removably attachable arms or bands.

BACKGROUND

Glasses have been an important part of society for nearly 1000 years. Due to different genetic makeup and potential defects, individuals may require the use of glasses for clear vision. Without the aid of glasses, many may miss their amazing surroundings, the fine details of life and may find themselves in danger situations. Some of the earliest glasses used various types of quartz so as to act as a clarifier and magnifier. Early forms of glasses were used by holding them in the hand and looking through the clarifying material (e.g., glass). Eventually glasses began to have frames, where the frames would secure the glass therein. However, many of these early frames lacked arms, which would force an individual to hold the frames up to their eyes. As the world progressed, so did glasses and their frames. The frames began to be developed with arms that could be positioned around each ear so as to hold the frame and glasses in place.

Numerous versions of glasses have been created since their inception. However, even with all of the improvements, frames still have many shortcomings. Some of these deficiencies come in the form of modularity. Typically, glasses are limited to a single function, such as having only stiff arms that may not me conducive to playing sports. Accordingly, if an individual desires to play a sport, the individual may have to attach an aftermarket part to prevent the frames from falling off of their face. These extra, aftermarket components may be expensive. Other individuals may be forced to purchase multiple types of frames depending on the activity. For example, the individual may have a daily pair and a sporting or outdoor pair. This is also a cost prohibitive and burdensome option for many people. Additional issues with glasses may be that the arms break and cause pain behind the ears due to the lack of adjustability.

Accordingly, there is a need for a single frame system that can be used for numerous types of activities. The present invention seeks to solve these and other problems.

SUMMARY OF EXAMPLE EMBODIMENTS

In one embodiment, a modular frame system for glasses includes a frame with a first eye portion on a first side and a second eye portion on a second side. Interposed between the first eye portion and the second eye portion may be a nasal bridge section that couples the first eye portion to the second eye portion. Positioned in the first eye portion may be a first lens and positioned in the second eye portion may be a second lens. Both the first and second lenses may include prescription lenses, sunglass lenses, or any other type of lens.

On a first lateral edge of the first eye portion may be a first protrusion. The first protrusion may extend rearward and include a first slot leading to a first channel. An outer side of the first protrusion may include a first aperture that passes through to the first channel. On a second lateral edge of the second eye portion may be a second protrusion. The second protrusion may extend rearward and include a second slot leading to a second channel. An outer side of the second protrusion may include a second aperture that passes through to the second channel.

In one embodiment, the modular frame system for glasses may further comprise a first coupling system. The first coupling system may include a first coupler and a second coupler both of which may be coupled to the frame. The first coupler may comprise a first portion and a second portion. The first portion may include a first coupler aperture on a rear side. The first coupler aperture may be configured to receive a headband, such as an elastic spiral band. The second portion may include a first upper prong, a first middle prong, and a first lower prong. The second portion may be similar in shape to the first slot so as to fit and be secured therein. Similarly, the second coupler may comprise a third portion and a fourth portion. The third portion may include a second coupler aperture on a rear side. The second coupler aperture may be configured to receive the headband. The fourth portion may include a second upper prong, a second middle prong, and a second lower prong, all of which are parallel to each other and spaced apart. The fourth portion may be similar in shape to the second slot so as to fit and be secured therein.

In one embodiment, the modular frame system for glasses may further comprise a second coupling system. The second coupling system may include a first coupler and a second coupler both of which may be coupled to the frame. The first coupler may comprise a first portion and a second portion. The first portion may include a first loop with a first loop aperture on a rear side. The first loop may be configured to receive a headband, such as an elastic band or non-elastic band. The second portion may include a first upper prong, a first middle prong, and a first lower prong, all of which are parallel to each other and spaced apart. The second portion may be similar in shape to the first slot so as to fit and be secured therein. Similarly, the second coupler may comprise a third portion and a fourth portion. The third portion may include a second loop with a second loop aperture on a rear side thereof. The second loop may be configured to receive the headband. The fourth portion may include a second upper prong, a second middle prong, and a second lower prong, all of which are parallel to each other and spaced apart. The fourth portion may be similar in shape to the second slot so as to fit and be secured therein.

In one embodiment, the modular frame system for glasses may further comprise a third coupling system. The coupling system may include a first coupler and a second coupler both of which may be coupled to the frame. The first coupler may comprise a first portion and a second portion. The first portion may include a first protrusion with a first protrusion aperture, a second protrusion with a second protrusion aperture, and a first protrusion channel therein between on a rear side. The first protrusion and the second protrusion may be configured to receive a first frame arm. The second portion may include a first upper prong, a first middle prong, and a first lower prong, all of which are parallel to each other and spaced apart. The second portion may be similar in shape to the first slot so as to fit and be secured therein. Similarly, the second coupler may comprise a third portion and a fourth portion. The third portion may include a third protrusion with a third protrusion aperture, a fourth protrusion with a fourth protrusion aperture, and a second protrusion channel therein between on a rear side. The third protrusion and the fourth protrusion may be configured to receive a second frame arm. The fourth portion may include a second upper prong, a second middle prong, and a second lower prong, all of which are parallel to each other. The fourth portion may be similar in shape to the second slot so as to fit and be secured therein.

In one embodiment, a modular frame system for glasses includes a frame with a first eye portion and a second eye portion. On a first lateral edge of the first eye portion may be a first mating section. The first mating section may extend rearward and include a first aperture and a second aperture. On a second lateral edge of the second eye portion may be a second mating section. The second mating section may extend rearward and include a third aperture and a fourth aperture.

The modular frame system may further comprise a coupling system. The coupling system may include a first coupler and a second coupler both of which may be coupled to the frame. The first coupler may comprise a first portion and a second portion. The first portion may include a first member with a first member aperture. The first member may receive a first cone with a first groove on an outer surface thereof and a first aperture. The second portion may include a first upper prong and a first lower prong. Similarly, the second coupler may comprise a third portion and a fourth portion. The third portion may include a second member with a second member aperture. The second member may receive a second cone with a second groove on an outer surface thereof and a second aperture. The fourth portion may include a second upper prong and a second lower prong.

In one embodiment, a modular frame system for glasses includes a frame with a first eye portion and a second eye portion. On a first front edge of the first eye portion may be a first recession. The first recession may be on a front of the frame. The first recession may include a first protrusion, a second protrusion, and a first aperture interposed between the first protrusion and the second protrusion. On a second front edge of the second eye portion may be a second recession. The second recession may be on a front of the frame. The second recession may include a third protrusion, a fourth protrusion, and a second aperture interposed between the third protrusion and the fourth protrusion.

The modular frame system may further comprise a coupling system. The coupling system may include a first coupler and a second coupler both of which may be coupled to the frame. The first coupler may comprise a first portion and a second portion. The first portion may include a first limb with a plurality of first coupler apertures. The plurality of first coupler apertures may be configured to receive a headband, such as an elastic spiral band. That is, a first end of the headband may be inserted into any of the plurality of first coupler apertures and be secured therein. The second portion may include a first member that comprises a first top slot, a first bottom slot, and a first member aperture interposed between the first top slot and the first bottom slot. To connect the first coupler to the frame, a user may slide the first and second protrusions into the first top slot and first bottom slot. Similarly, the second coupler may comprise a third portion and a fourth portion. The third portion may include a second limb with a plurality of second coupler apertures. The plurality of second coupler apertures may be configured to receive the headband. That is, a second end of the headband may be inserted into any of the plurality of second coupler apertures and be secured therein. The fourth portion may include a second member that comprises a second top slot, a second bottom slot, and a second member aperture interposed between the second top slot and the second bottom slot. To connect the second coupler to the frame, a user may slide the third and fourth protrusions into the second top slot and the second bottom slot.

DETAILED DESCRIPTION OF EXAMPLE EMBODIMENTS

Figure 1:
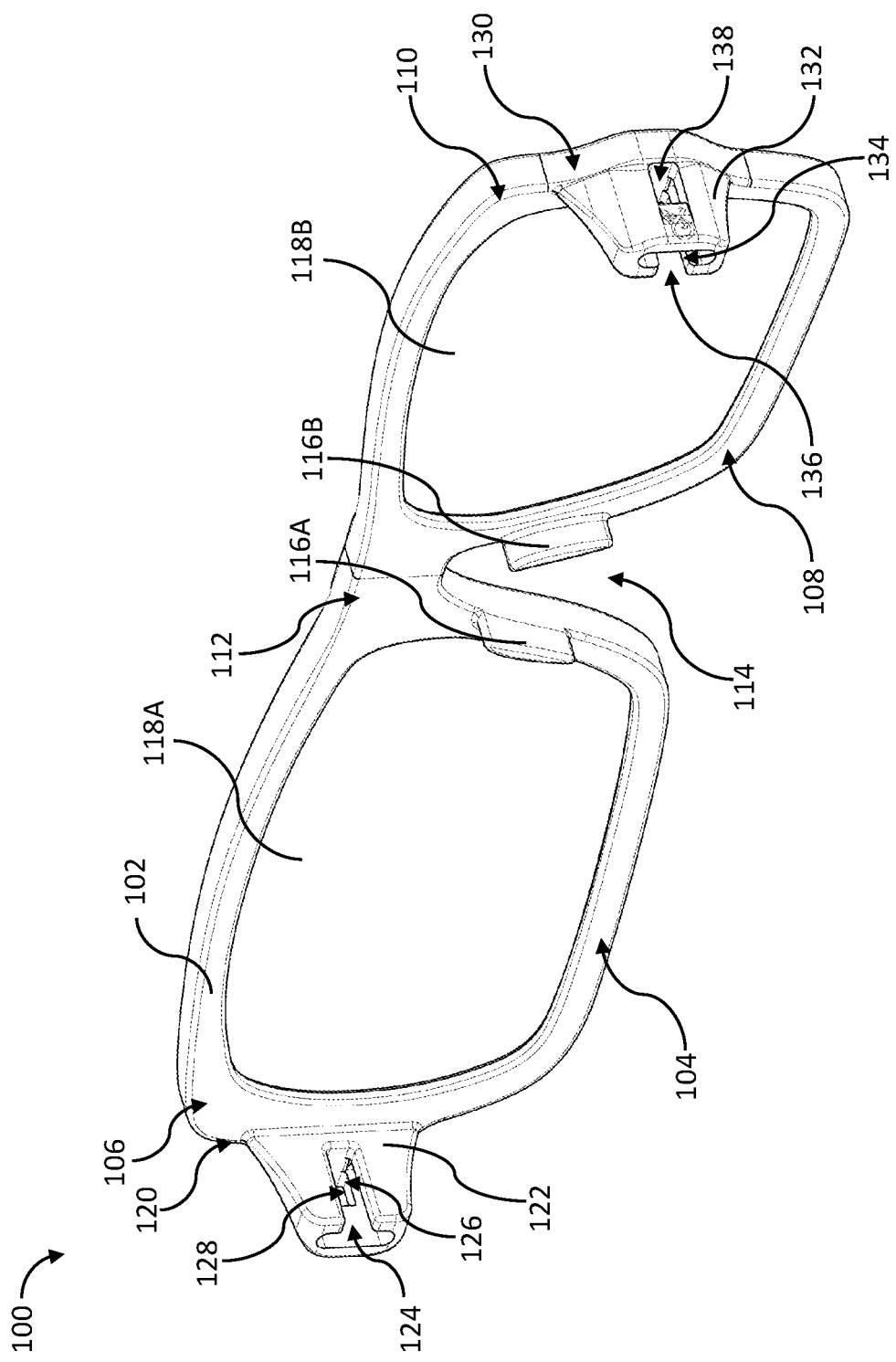
FIG. 1 illustrates a rear, side perspective view of a modular frame system for glasses.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed.

Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a single frame system that can be used for numerous types of activities. The present invention seeks to solve these and other problems.

Glasses have been used for hundreds of years and are necessary for many due to numerous reasons. Even though glasses have been around for many, many years, there are still inherent shortcomings. That is, glasses with frames that rest on the ears often cause pain to a user after extended periods of use. Further, glasses often do not stay in place on a user's face during activity, such as running, jumping, or hiking. Because of this, users constantly have to move glasses which is not only an annoyance, but also can be a cause of facial pain. Some have attempted to curtail the effects of traditional glasses by changing frame material, adjusting the configuration (e.g., length and width) of the frame, and using goggle type glasses for strenuous activities. However, with these adjustments, users may still experience discomfort and many users are forced to purchase numerous styles of prescription and non-prescription glasses based on the activity, meaning a single user may have to have multiple pairs of glasses.

The modular frame system described herein comprises a frame with numerous coupling systems, arms, and bands to adjust to any user, whether male, female, young, or old. The system allows a user to quickly adjust and change the arms or band on a single frame, which would allow the user to change his/her single frame with the various bands to address any activity. It will be appreciated that the system allows a user to have comfort while wearing the frame and allows a user to save money by having a single frame.

Figure 2:
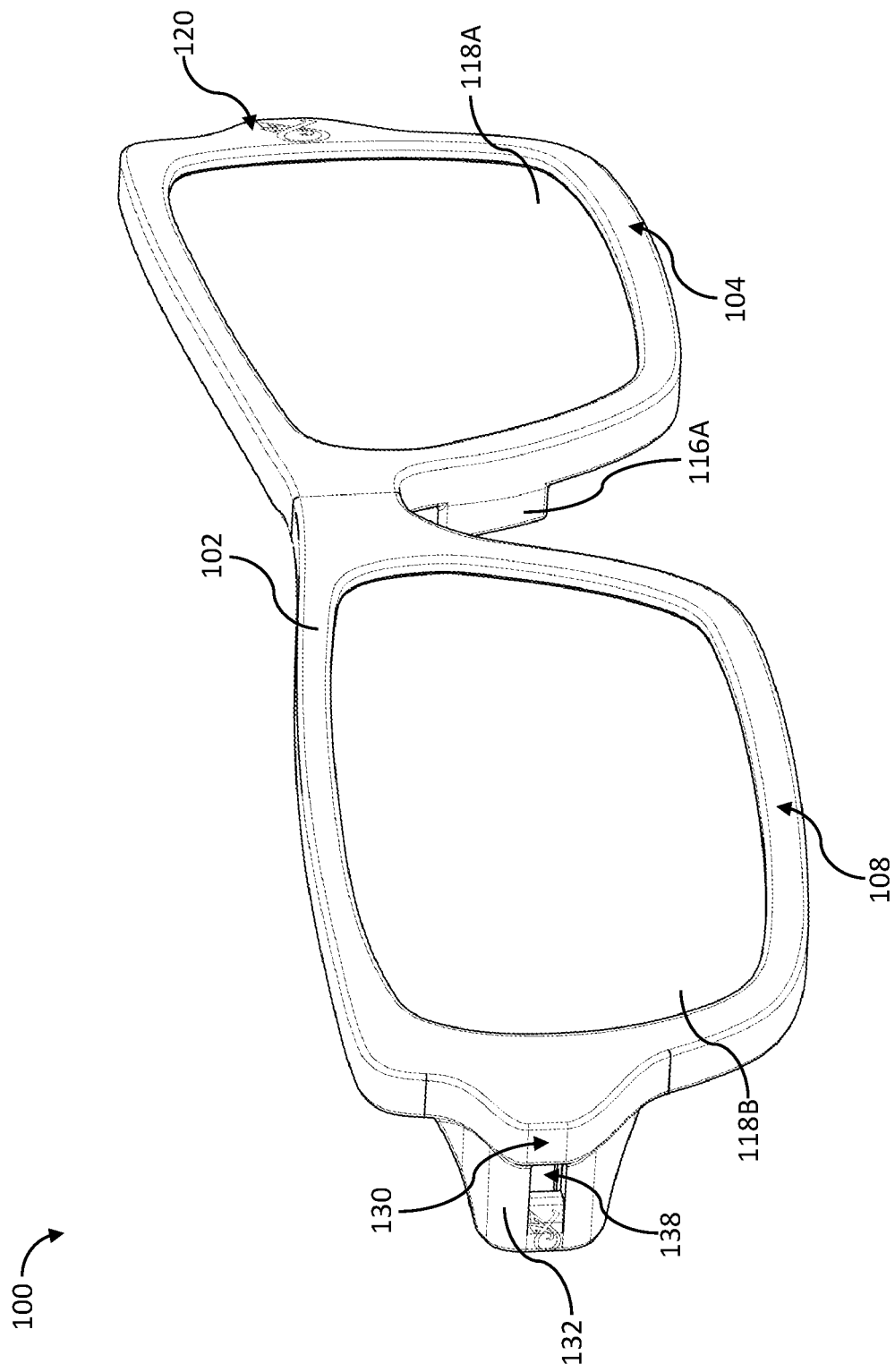
FIG. 2 illustrates a front, side perspective view of a modular frame system for glasses.

As shown in FIGS. 1-2, in one embodiment, a modular frame system for glasses 100 (hereinafter referred to as the "system") includes a frame 102 with a first eye portion 104 on a first side 106 and a second eye portion 108 on a second side 110. Interposed between the first eye portion 104 and the second eye portion 108 may be a nasal bridge section 112 that couples the first eye portion 104 to the second eye portion 108. The frame 102 may be manufactured out of a plastic material (e.g., zyl or propionate), metal (e.g., aluminum, titanium, or steel), fiberglass, carbon fiber, wood, or any other material known in the art. A gap 114 may be positioned below the nasal bridge section 112 to receive a nose of a user. Proximate the gap 114 on the first eye portion 104 may be a first nose pad 116A and proximate the gap 114 on the second eye portion 108 may be a second nose pad 116B. The first and second nose pads 116A, 116B may protrude rearward toward the face of the user when positioned thereon. The first and second nose pads 116A, 116B may be manufactured and molded as a single unit with the frame 102. In other embodiments, the first and second nose pads 116A, 116B may be removably attachable and adjustable so as to adjust to a specific user's nose. Positioned in the first eye portion 104 may be a first lens 118A and the second eye portion 108 may be a second lens 118B. Both the first and second lenses 118A, 118B may include prescription lenses, sunglass lenses, or any other type of lens.

On a first lateral edge 120 of the first eye portion 104 may be a first protrusion 122. The first protrusion 122 may extend rearward and include a first slot 124 leading to and interacting with a first channel 126, the first channel 126 being a first distance/depth. The first channel 126 being opened on an inner side of the first protrusion 122 that faces the face of the user. An outer side of the first protrusion 122 may include a first aperture 128 that passes through to the first channel 126. On a second lateral edge 130 of the second eye portion 108 may be a second protrusion 132. The second protrusion 132 may extend rearward and include a second slot 134 leading to and interacting with a second channel 136, the second channel 136 being a second distance/depth. The second channel 136 being opened on an inner side of the second protrusion 132 that faces the face of the user. An outer side of the second protrusion 132 may include a second aperture 138 that passes through to the second channel 136.

Figure 3:
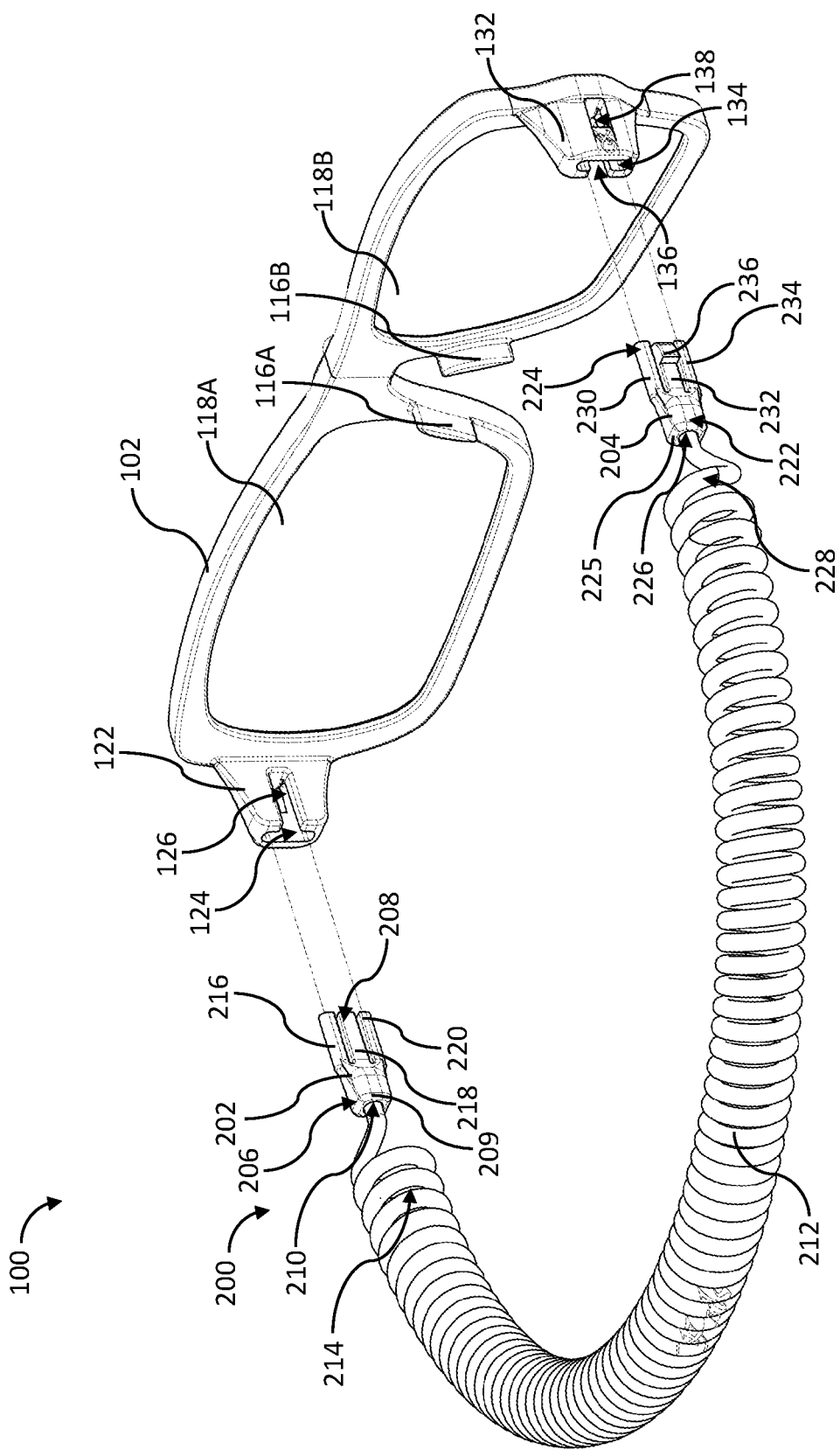
FIG. 3 illustrates a rear, side perspective view of a modular frame system for glasses.

As shown in FIG. 3, the system 100 may further comprise a coupling system 200. The coupling system 200 may include a first coupler 202 and a second coupler 204 both of which may be coupled to the frame 102. The first coupler 202 may comprise a first portion 206 and a second portion 208. The first portion 206 may include a first shaft 209 with a first coupler aperture 210 on a rear side. The first coupler aperture 210 may be configured to receive a headband 212, such as an elastic spiral band. That is, a first end 214 of the headband may be inserted into the first coupler aperture 210 and secured therein. The second portion 208 may include a first upper prong 216, a first middle prong 218, and a first lower prong 220, all of which are parallel to each other and spaced apart. The first upper prong 216 and the first lower prong 220 may be similar in shape, length, and configuration. The first middle prong 218 may comprise a first finger (similar to the finger discussed on the second coupler 204) that protrudes from a lateral side of the first middle prong 218. The first finger may comprise a first curved portion and a first flat, locking portion that may be at least a 90-degree angle to the first middle prong 218. The second portion 208 may be similar in shape to the first slot 124 so as to fit and be secured therein. As a user pushes the second portion 208 into the first slot 124, the second portion 208 moves inward as the first finger is depressed, with the first middle prong 218 pushed into the first channel 126 temporarily, and then the first finger rebounds into the first aperture 128 and a resting, secured position.

Similarly, the second coupler 204 may comprise a third portion 222 and a fourth portion 224. The third portion 222 may include a second shaft 225 with a second coupler aperture 226 on a rear side. The second coupler aperture 226 may be configured to receive the headband 212. That is, a second end 228 of the headband 212 may be inserted into the second coupler aperture 226 and secured therein. The fourth portion 224 may include a second upper prong 230, a second middle prong 232, and a second lower prong 234, all of which are parallel to each other and spaced apart. The second upper prong 230 and the second lower prong 234 may be similar in shape, length, and configuration. The second middle prong 232 may comprise a second finger 236 that protrudes from a lateral side of the second middle prong 232. The second finger 236 may comprise a second curved portion and a second flat, locking portion that may be at least a 90-degree angle to the second middle prong 232. The fourth portion 224 may be similar in shape to the second slot 134 so as to fit and be secured therein. As a user pushes the fourth portion 224 into the second slot 134, the fourth portion 224 moves inward as the second finger 236 is depressed, with the second middle prong 232 pushed into the second channel 136 temporarily, and then the second finger 236 rebounds into the second aperture 138 and a resting, secured position.

Figure 4:
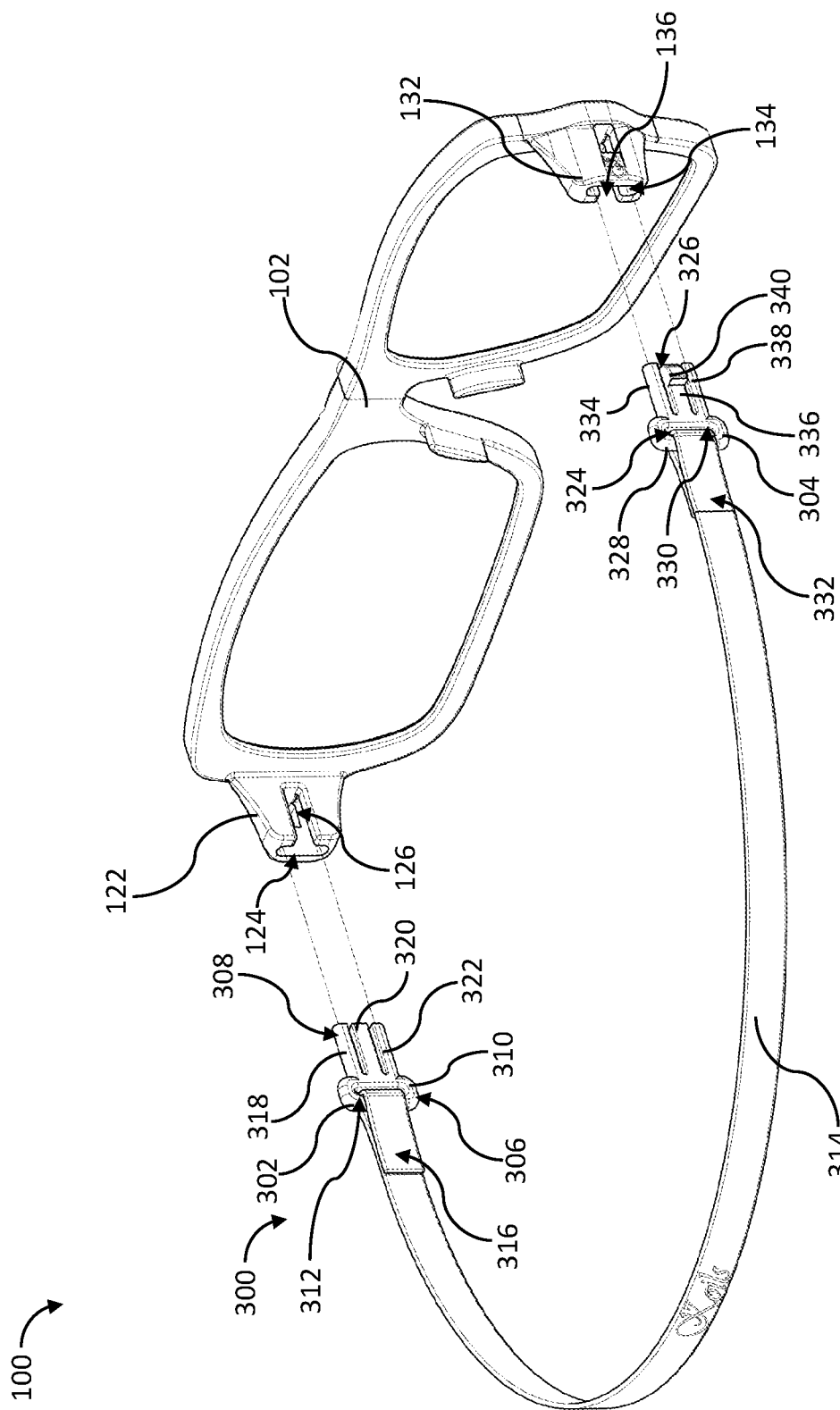
FIG. 4 illustrates a rear, side perspective view of a modular frame system for glasses.

As shown in FIG. 4, the system 100 may further comprise a coupling system 300. The coupling system 300 may include a first coupler 302 and a second coupler 304 both of which may be coupled to the frame 102. The first coupler 302 may comprise a first portion 306 and a second portion 308. The first portion 306 may include a first loop 310 with a first loop aperture 312 on a rear side. The first loop 310 being vertically fixed when coupled to the frame 102. The first loop 310 may be configured to receive a headband 314, such as an elastic band or non-elastic band. That is, a first end 316 of the headband 314 may be inserted into the first loop 310 and secured therearound. The second portion 308 may include a first upper prong 318, a first middle prong 320, and a first lower prong 322, all of which are parallel to each other and spaced apart. The first upper prong 318 and the first lower prong 322 may be similar in shape, length, and configuration. The first middle prong 320 may comprise a first finger (similar to the finger discussed below for the second coupler) that protrudes from a lateral side of the first middle prong 320. The first finger may comprise a first curved portion and a first flat, locking portion that may be at least a 90-degree angle to the first middle prong 320. The second portion 308 may be similar in shape to the first slot 124 so as to fit and be secured therein. As a user pushes the second portion 308 into the first slot 124, the second portion 308 moves inward as the first finger is depressed, with the first middle prong 320 pushed into the first channel 126 temporarily, and then the first finger rebounds into the first aperture 128 (FIG. 1) and a resting position.

Similarly, the second coupler 304 may comprise a third portion 324 and a fourth portion 326. The third portion 324 may include a second loop 328 with a second loop aperture 330 on a rear side. The second loop 328 being vertically fixed when coupled to the frame 102. The second loop 328 may be configured to receive the headband 314. That is, a second end 332 of the headband 314 may be inserted into the second loop 328 and secured therearound. The fourth portion 326 may include a second upper prong 334, a second middle prong 336, and a second lower prong 338, all of which are parallel to each other and spaced apart. The second upper prong 334 and the second lower prong 338 may be similar in shape, length, and configuration. The second middle prong 336 may comprise a second finger 340 that protrudes from a lateral side of the second middle prong 336. The second finger 340 may comprise a second curved portion and a second flat, locking portion that may be at least a 90-degree angle to the second middle prong 336. The fourth portion 326 may be similar in shape to the second slot 134 so as to fit and be secured therein. As a user pushes the fourth portion 326 into the second slot 134, the fourth portion 326 moves inward as the second finger 340 is depressed, with the second middle prong 336 pushed into the second channel 136 temporarily, and then the second finger 340 rebounds into the second aperture 138 (FIG. 1) and a resting position.

Figure 5:
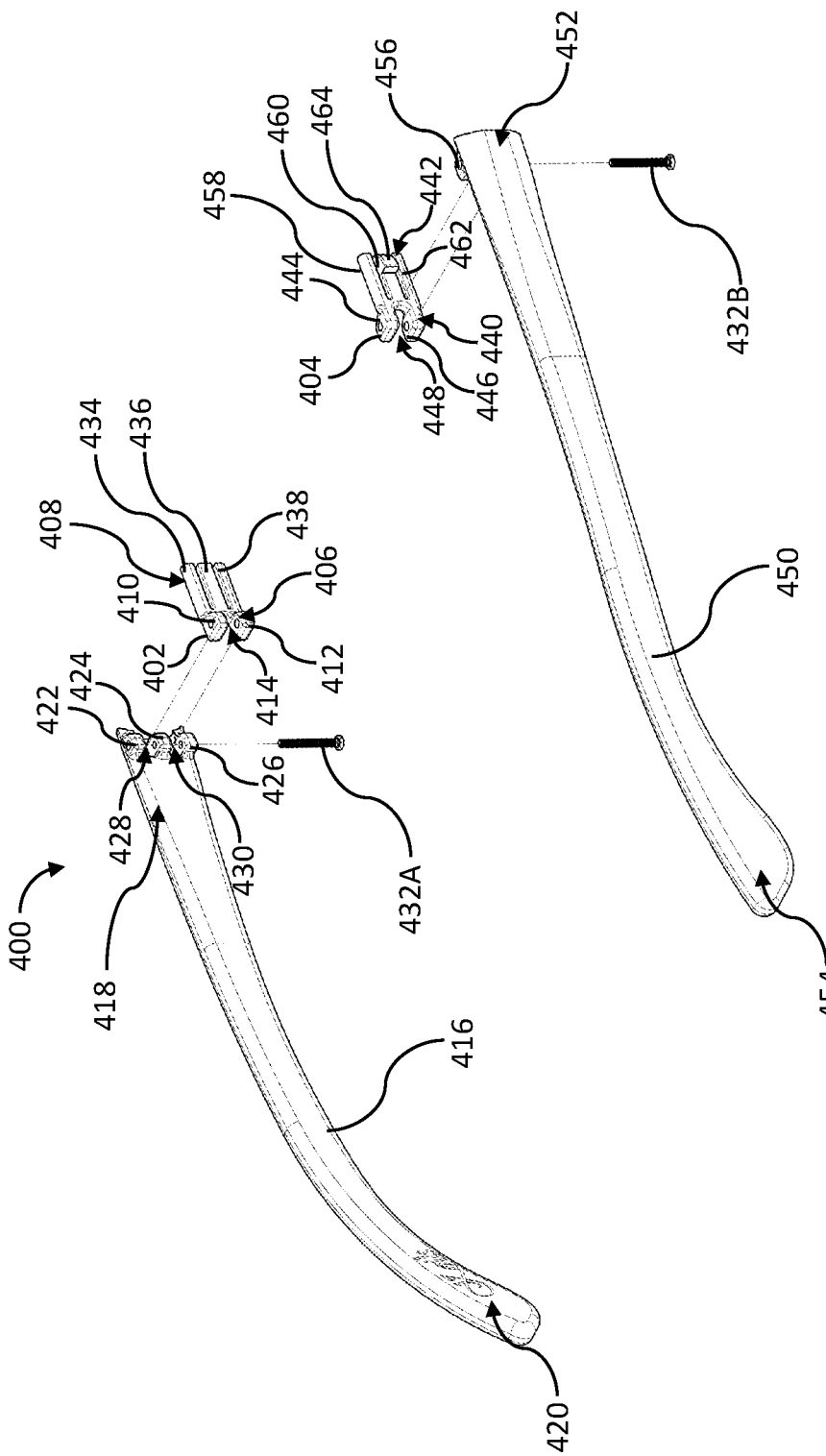
FIG. 5 illustrates a perspective view of a coupling system of a modular frame system for glasses.
Figure 6:
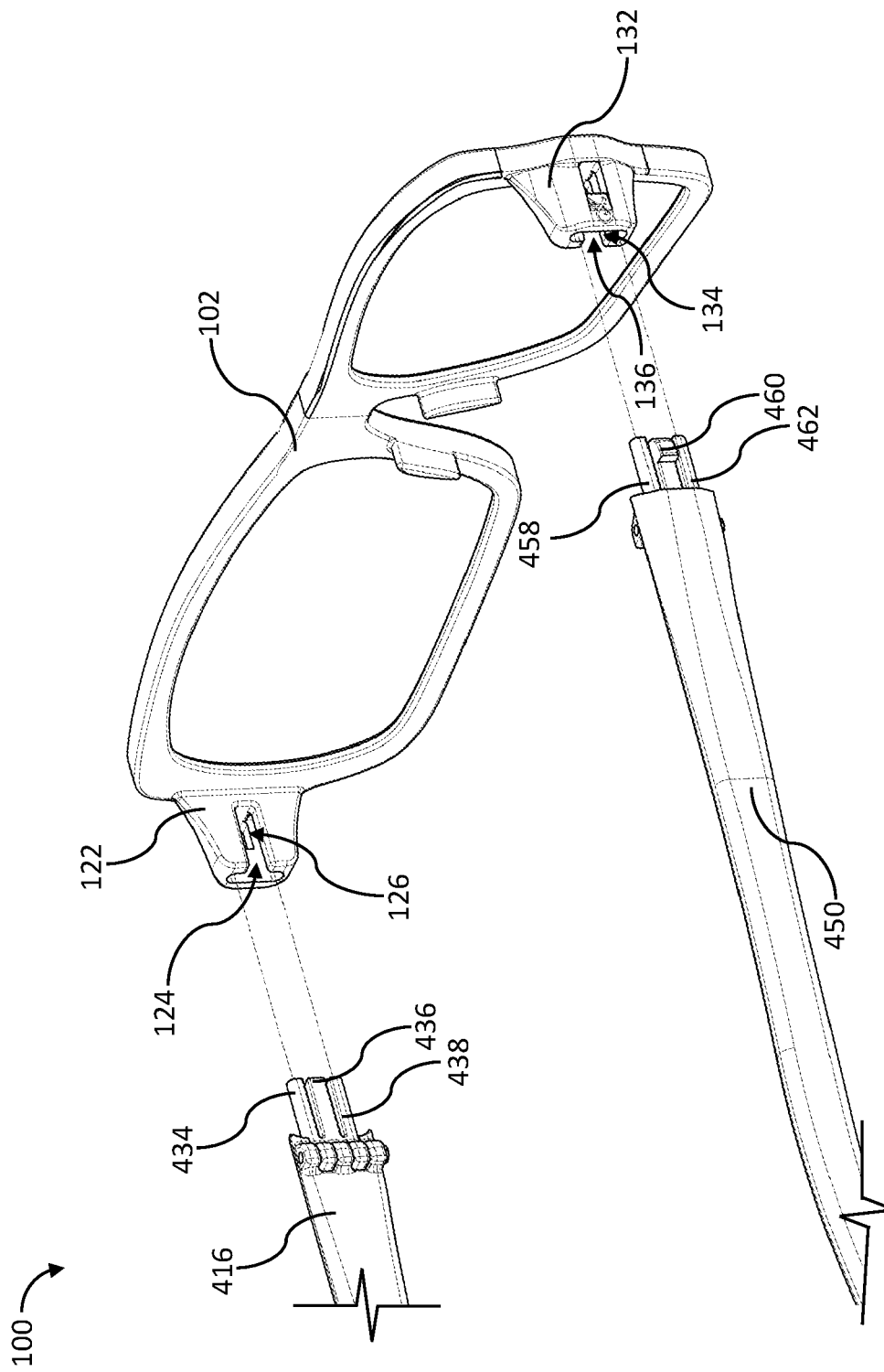
FIG. 6 illustrates a rear, side perspective view of a modular frame system for glasses.
Figure 7:
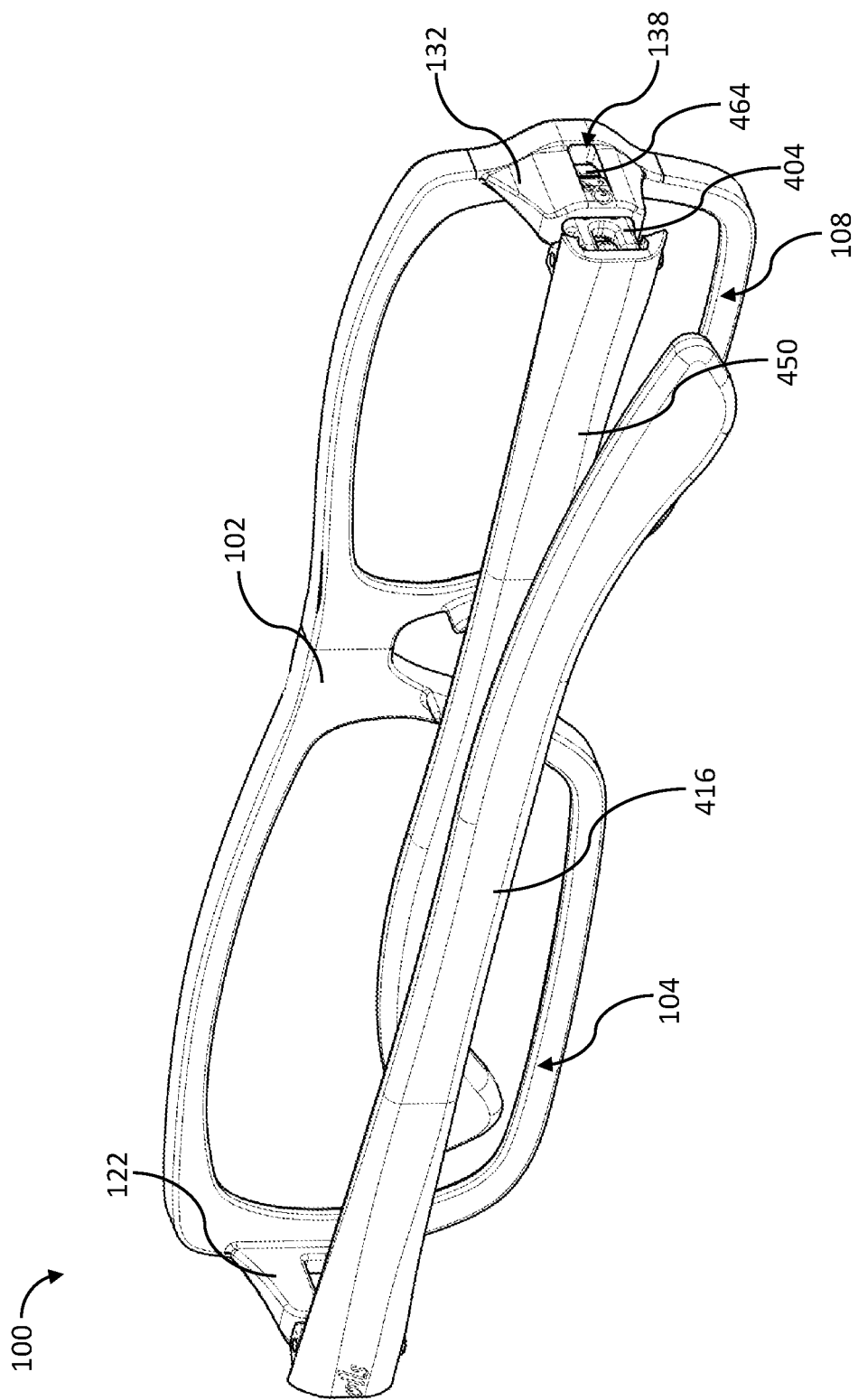
FIG. 7 illustrates a rear, side perspective view of a modular frame system for glasses.

As shown in FIGS. 5-7, the system 100 may further comprise a coupling system 400. The coupling system 400 may include a first coupler 402 and a second coupler 404 both of which may be coupled to the frame 102. The first coupler 402 may comprise a first portion 406 and a second portion 408. The first portion 406 may include a first portion protrusion 410 with a first protrusion aperture, a second portion protrusion 412 with a second protrusion aperture, and a first protrusion channel 414 thereinbetween on a rear side. The first portion protrusion 410 and the second portion protrusion 412 may be configured to receive a first frame arm 416. That is, a first end 418, opposite a second end 420, of the first frame arm 416 may comprise a first frame finger 422 with a first frame aperture, a second frame finger 424 with a second frame aperture, and a third frame finger 426 with a third frame aperture, with a first frame channel 428 interposed between the first and second frame fingers 422, 424 and a second frame channel 430 interposed between the second and third frame fingers 424, 426. The first protrusion 410 and the second protrusion 412 may be positioned in the first frame channel 428 and second frame channel 430, respectively. A frame fastener 432A (e.g., a screw) may be inserted through the first frame aperture, the first protrusion aperture, the second frame aperture, the second protrusion aperture, and the third frame aperture so as to secure the first coupler 402 to the first frame arm 416. It will be appreciated that the frame fastener 432A allows the first frame arm 416 to be hingedly coupled to the frame 102. The second portion 408 may include a first upper prong 434, a first middle prong 436, and a first lower prong 438, all of which are parallel to each other and spaced apart. The first upper prong 434 and the first lower prong 438 may be similar in shape, length, and configuration. The first middle prong 436 may comprise a first finger (similar to the second finger described below on the second coupler) that protrudes from a lateral side of the first middle prong 436. The first finger may comprise a first curved portion and a first flat, locking portion that may be at least a 90-degree angle to the first middle prong 436. The second portion 408 may be similar in shape to the first slot 124 so as to fit and be secured therein. As a user pushes the second portion 408 into the first slot 124, the second portion 408 moves inward as the first finger is depressed, with the first middle prong 436 pushed into the first channel 126 temporarily, and then the first finger rebounds into the first aperture 128 and a resting position.

Similarly, the second coupler 404 may comprise a third portion 440 and a fourth portion 442. The third portion 440 may include a third protrusion 444 with a third protrusion aperture, a fourth protrusion 446 with a fourth protrusion aperture, and a second protrusion channel 448 thereinbetween on a rear side. The third protrusion 444 and the fourth protrusion 446 may be configured to receive a second frame arm 450. That is, a third end 452, opposite a fourth end 454, of the second frame arm 450 may comprise a fourth frame finger 456 with a fourth frame aperture, a fifth frame finger (similar to the second frame finger) with a fifth frame aperture, and a sixth frame finger (similar to the third frame finger) with a sixth frame aperture, with a third frame channel (not shown, similar to the first frame channel) interposed between the fourth and fifth frame fingers and a fourth frame channel (not shown, similar to the second frame channel) interposed between the fifth and sixth frame fingers. The third protrusion 444 and the fourth protrusion 446 may be positioned in the third frame channel and fourth frame channel, respectively. A frame fastener 432B (e.g., a screw) may be inserted through the fourth frame aperture, the third protrusion aperture, the fifth frame aperture, the fourth protrusion aperture, and the sixth frame aperture so as to secure the second coupler 404 to the second frame arm 450. It will be appreciated that the frame fastener 432B allows the second frame arm 450 to be hingedly coupled to the frame 102. The fourth portion 442 may include a second upper prong 458, a second middle prong 460, and a second lower prong 462, all of which are parallel to each other. The first upper prong 458 and the first lower prong 462 may be similar in shape, length, and configuration. The second middle prong 460 may comprise a second finger 464 that protrudes from a lateral side of the second middle prong 460. The second finger 464 may comprise a second curved portion and a second flat, locking portion that may be at least a 90-degree angle to the second middle prong 460. The fourth portion 442 may be similar in shape to the second slot 134 so as to fit and be secured therein. As a user pushes the fourth portion 442 into the second slot 134, the fourth portion 442 moves inward as the second finger 464 is depressed, with the second middle prong 460 pushed into the second channel 136 temporarily, and then the second finger 464 rebounds into the second aperture 138 and a resting position.

Figure 8:
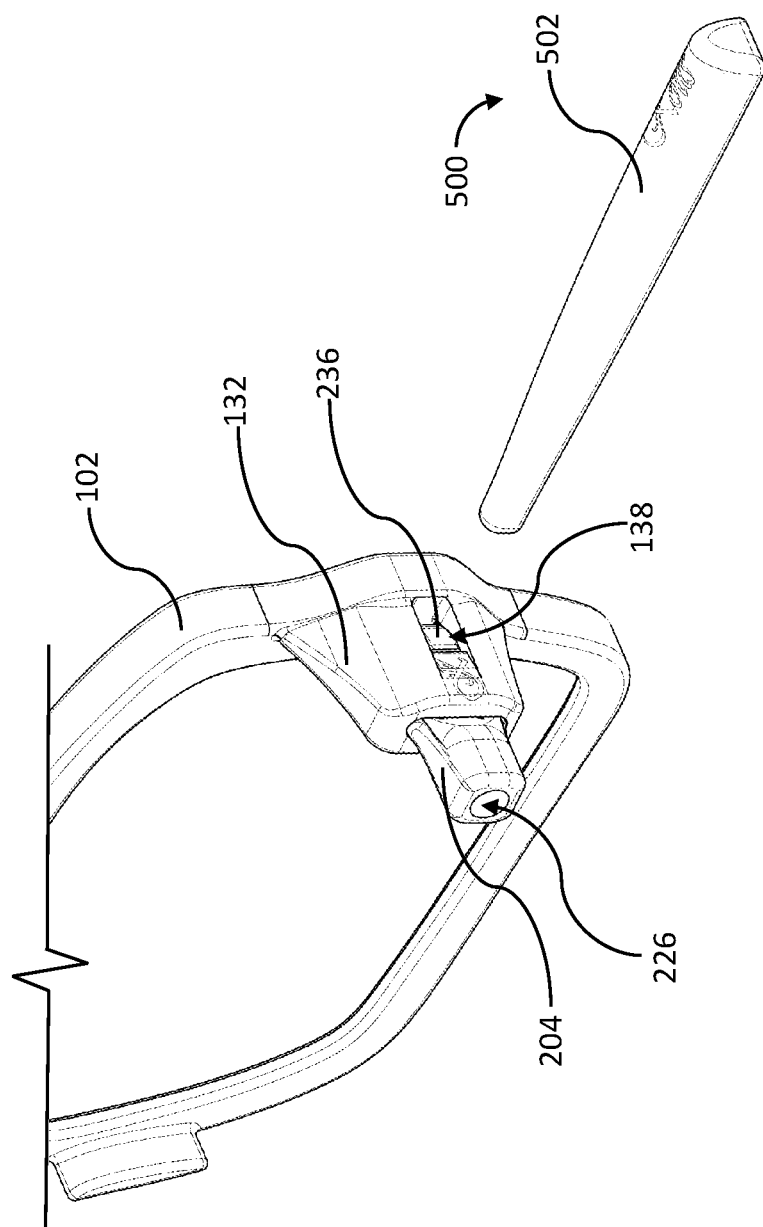
FIG. 8 illustrates a rear, side perspective view of a depressor of a modular frame system for glasses.
Figure 9:
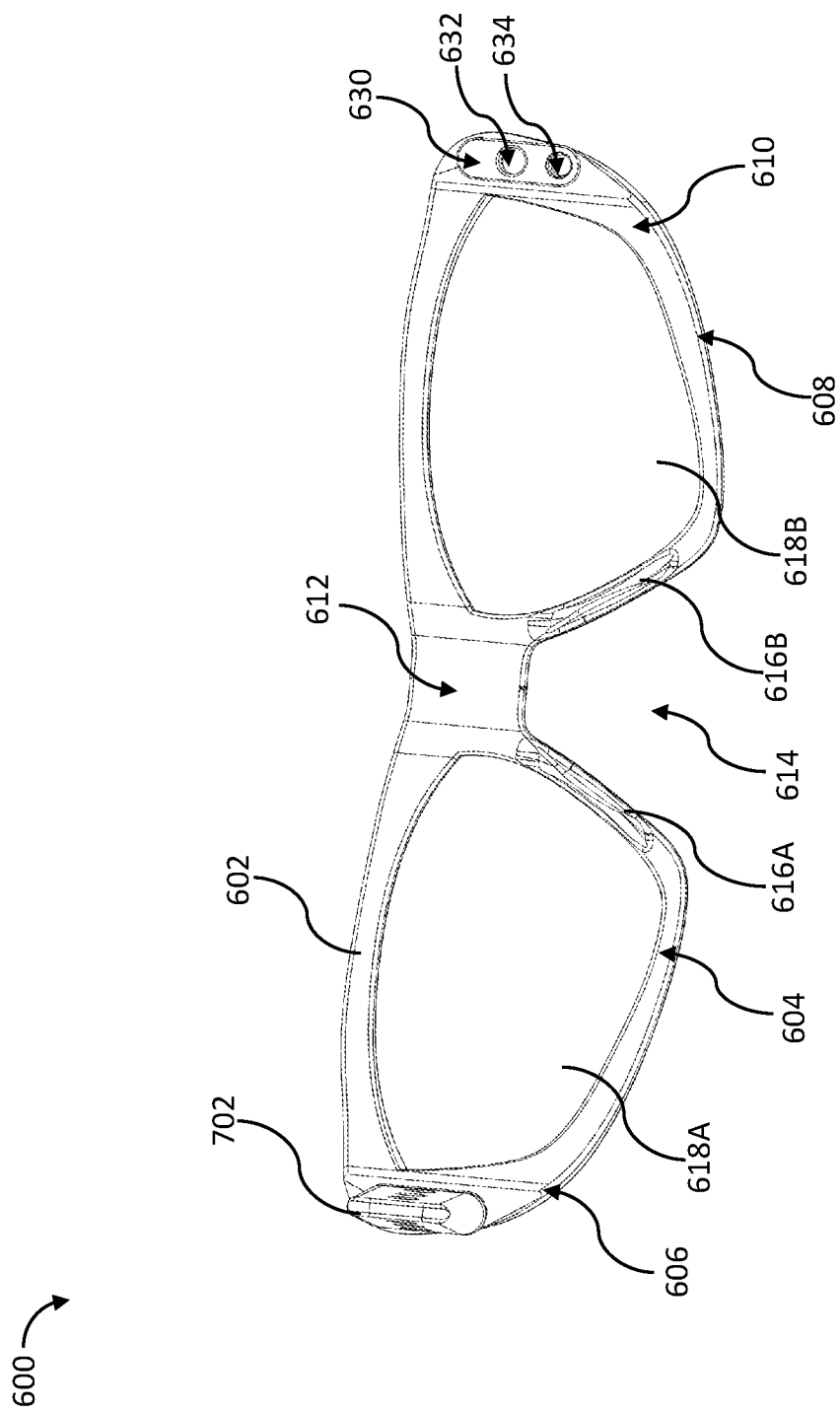
FIG. 9 illustrates a rear perspective view of a frame of a modular frame system for glasses.

As shown in FIG. 8, the system 100 may utilize a depressor/rod apparatus 500 that comprises a shaft 502 that is used to depress the first and second fingers on any of the aforementioned couplers. The shaft 502 may be tapered to fit into the, for example, second aperture 138. For example, a user may depress the second finger 236 in the second aperture 138 on the frame 102, thereby pushing the second middle prong 232 into the first channel 136, and pull out the second coupler 204. It will be appreciated that the depressor apparatus 500 may be used with the coupling system 200, 300, or 400. It will be understood that in other embodiments, magnets may be used to couple the bands or arms to the frame 102. Further, in some embodiments, instead of, for example, fingers that lock into an aperture, a button may be used where a user may depress the button with his or her fingers to remove the couplers. In some embodiments, the system may include frames with screw holes for arm attachment may be widened to receive a fastener, such as a key chain coil, that is removably attachable thereto. In other embodiments, the system may include a frame with arms (e.g., short arms) that use magnets to attach to the frame and then utilize bands to hold the glasses with the frame around the neck of the user. In another embodiment, the system may include a button on the inside of both sides of a frame that a user can push so as to release the arms to change to different arms, bands, or coils.

It will be appreciated that the frame 102 or any other frames mentioned herein and the numerous arms, bands, etc. can easily be replaced or changed to address a user's specific needs, whether that be walking, running, swimming, etc. The system 100 described herein removes the pain that is often felt when wearing traditional framed glasses for too long. The headbands discussed above may have different elasticity so as to be adjustable and configured for any age, head shape, or activity. It will be appreciated that the system 100 keeps glasses on the head of the user during any activity, without the constant slipping and adjusting that traditional frames require. Not only is the system 100 functional, but individuals can change the style and color of the glasses rapidly to match an outfit.

As shown in FIGS. 9-12, in one embodiment, a modular frame system for glasses 600 (hereinafter referred to as the "system") includes a frame 602 with a first eye portion 604 on a first side 606 and a second eye portion 608 on a second side 610. Interposed between the first eye portion 604 and the second eye portion 608 may be a nasal bridge section 612 that couples the first eye portion 604 to the second eye portion 608. The frame 602 may be manufactured out of a plastic material (e.g., zyl or propionate), metal (e.g., aluminum, titanium, or steel), fiberglass, carbon fiber, wood, or any other material known in the art. A gap 614 may be positioned below the nasal bridge section 612 to receive a nose of a user. Proximate the gap 614 on the first eye portion 604 may be a first nose pad 616A and proximate the gap 614 on the second eye portion 608 may be a second nose pad 616B. The first and second nose pads 616A, 616B may protrude rearward toward the face of the user when positioned thereon. The first and second nose pads 616A, 616B may be manufactured and molded as a single unit with the frame 602. In other embodiments, the first and second nose pads 616A, 616B may be removably attachable and adjustable so as to adjust to a specific user's nose. Positioned in the first eye portion 604 may be a first lens 618A and the second eye portion 608 may be a second lens 618B. Both the first and second lenses 618A, 618B may include prescription lenses, sunglass lenses, or any other type of lens.

Figure 10:
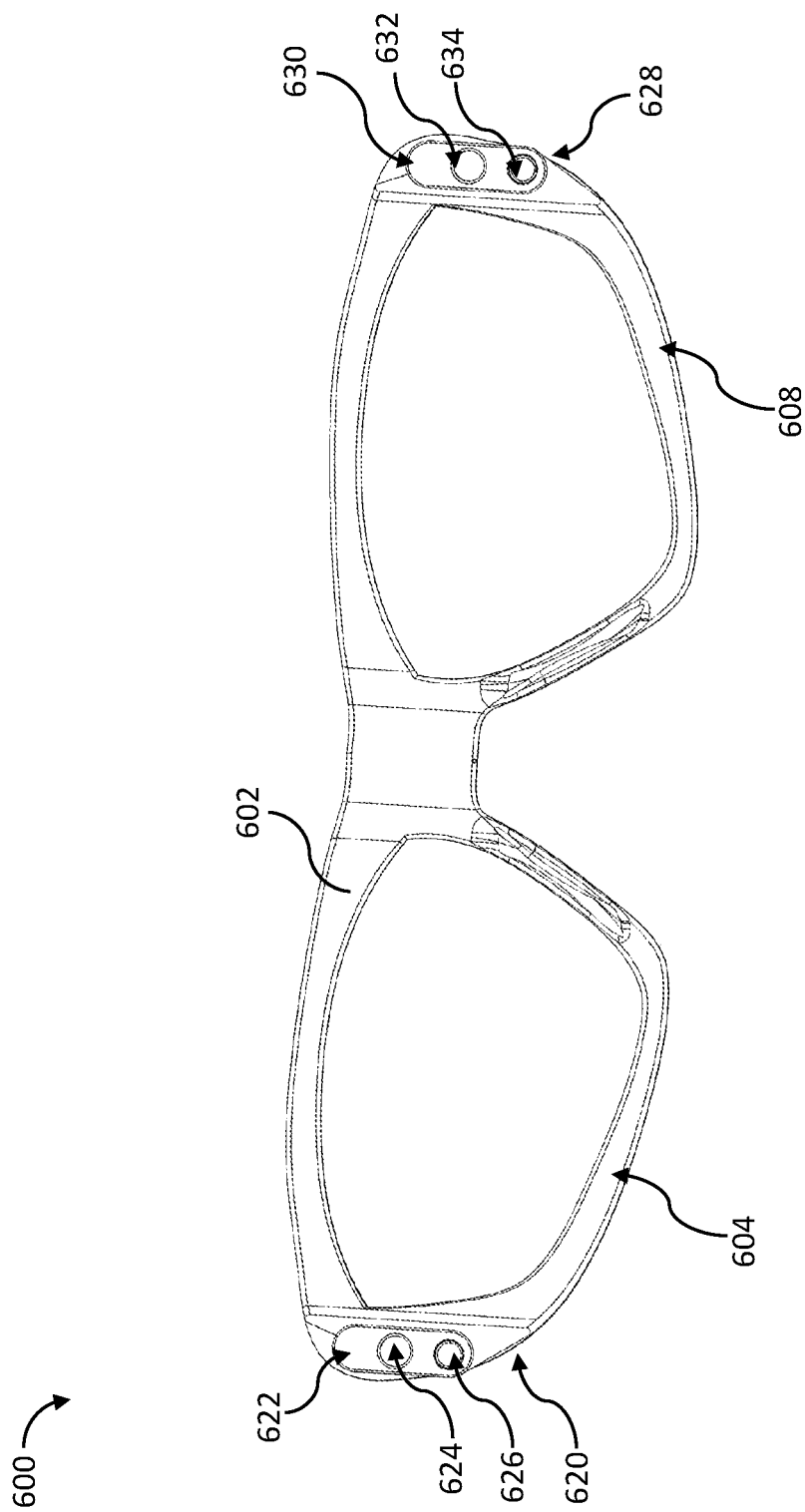
FIG. 10 illustrates a rear perspective view of a frame of a modular frame system for glasses.

As shown in FIG. 10, on a first lateral edge 620 of the first eye portion 604 may be a first mating section 622. The first mating section 622 may extend rearward and include a first aperture 624 and a second aperture 626, the first aperture 624 being larger in diameter than the second aperture 626. However, in some embodiments, the apertures may be the same sizes or different sizes. On a second lateral edge 628 of the second eye portion 608 may be a second mating section 630. The second mating section 630 may extend rearward and include a third aperture 632 and a fourth aperture 634, the third aperture 632 being larger in diameter than the fourth aperture 634. However, in some embodiments, the apertures may be the same sizes or different sizes.

Figure 11:
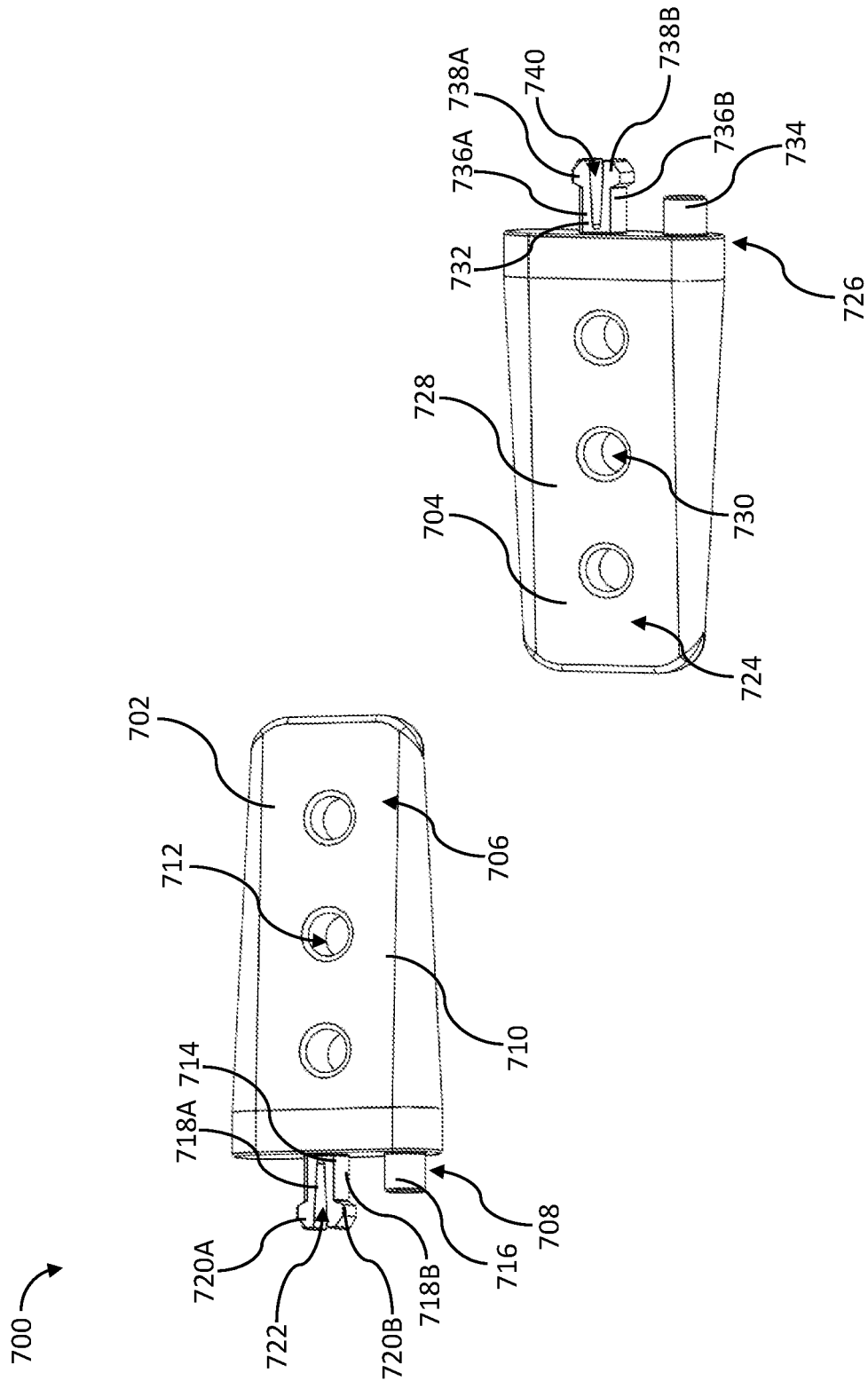
FIG. 11 illustrates a side perspective view of a coupling system of a modular frame system for glasses.
Figure 12:
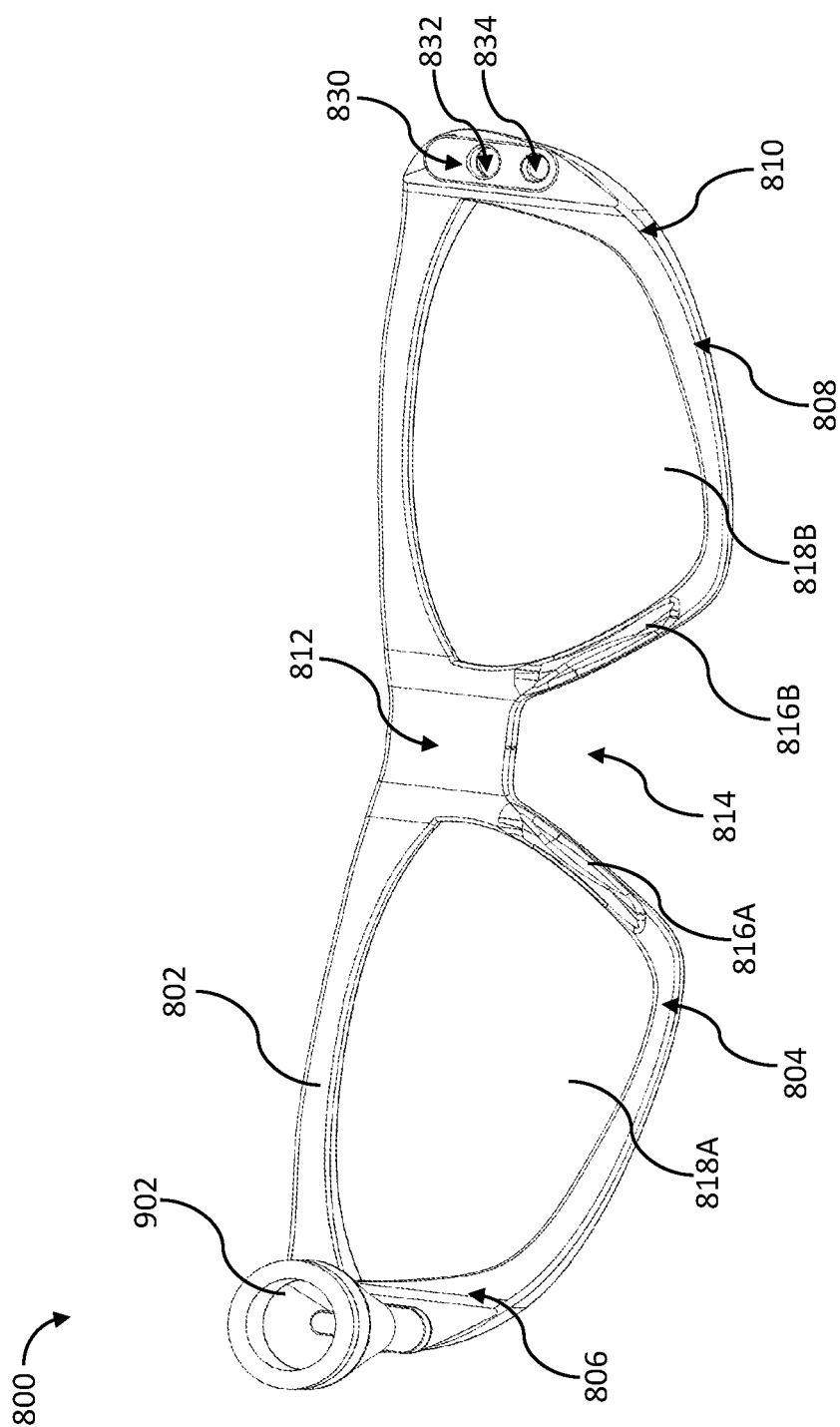
FIG. 12 illustrates a rear perspective view of a frame of a modular frame system for glasses.
Figure 13:
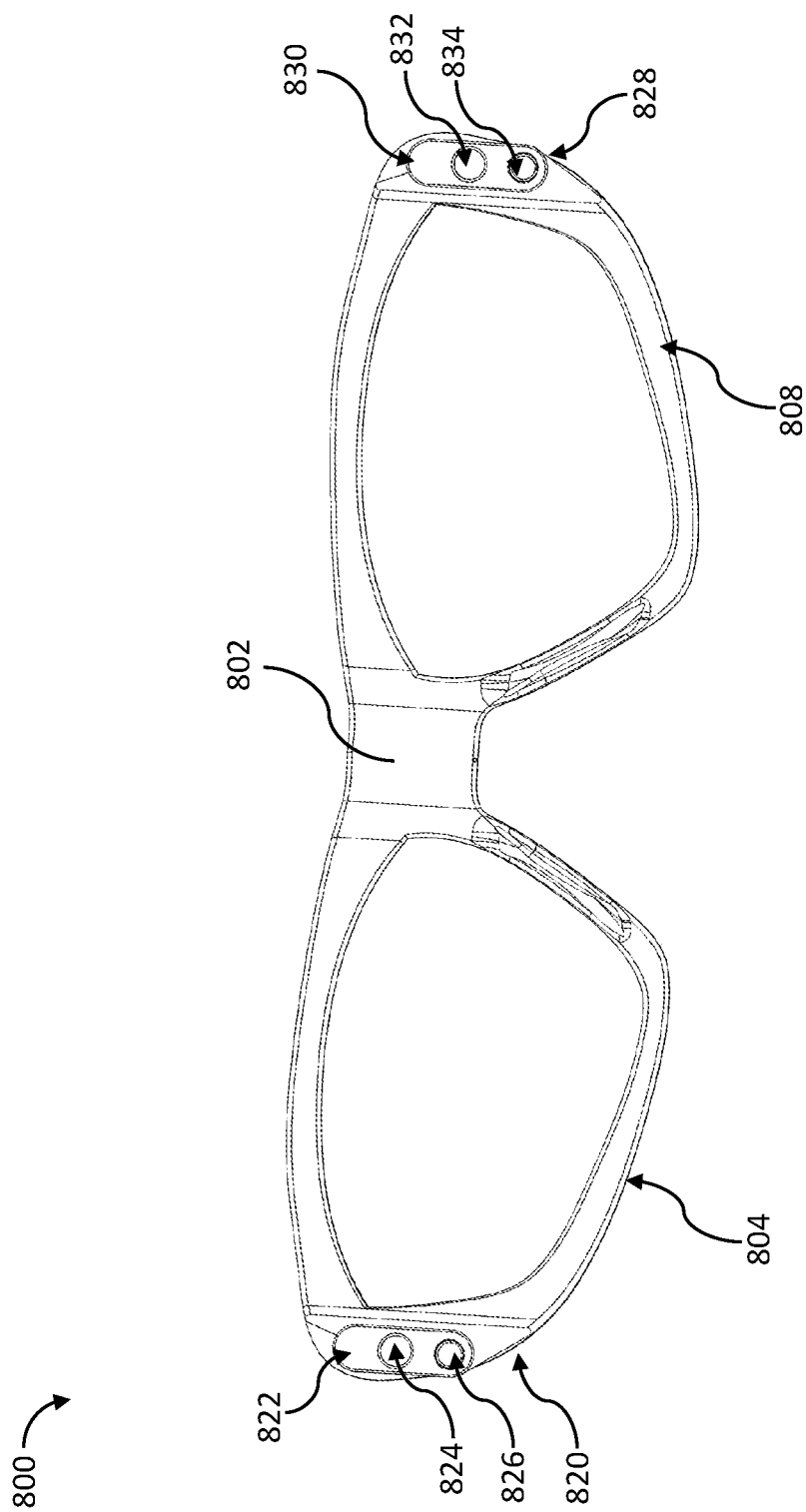
FIG. 13 illustrates a rear perspective view of a frame of a modular frame system for glasses.

As shown in FIG. 11, the system 600 may further comprise a coupling system 700. The coupling system 700 may include a first coupler 702 and a second coupler 704 both of which may be coupled to the frame 602. The first coupler 702 may comprise a first portion 706 and a second portion 708. The first portion 706 may include a first limb 710 with a plurality of first coupler apertures 712. The plurality of first coupler apertures 712 may be configured to receive a headband, such as an elastic spiral band. That is, a first end of the headband may be inserted into any of the plurality of first coupler apertures 712 and be secured therein. The second portion 708 may include a first upper prong 714 and a first lower prong 716, both of which are parallel to each other and spaced apart and may be different lengths. The first upper prong 714 may include a first arm 718A with a first finger 720A and a second arm 718B, spaced apart from the first arm 718A, with a second finger 720B. The first finger 720A may comprise a first curved portion and a first generally flat, locking portion. The second finger 720B may comprise a second curved portion and a second generally flat, locking portion. A first gap 722 may be positioned between the first and second arms 718A, 718B, thereby allowing the arms 718A, 718B to squeeze together and rebound so as to secure the first coupler 702 to the frame 602. Accordingly, to secure the first coupler 702 to the frame 602, a user may place the first upper prong 714 in the first aperture 624 and the first lower prong 716 in the second aperture 626.

Similarly, the second coupler 704 may comprise a third portion 724 and a fourth portion 726. The third portion 724 may include a second limb 728 with a plurality of second coupler apertures 730. The plurality of second coupler apertures 730 may be configured to receive a headband, such as an elastic spiral band. That is, a second end of the headband may be inserted into any of the plurality of second coupler apertures 730 and be secured therein. The fourth portion 726 may include a second upper prong 732 and a second lower prong 734, both of which are parallel to each other and spaced apart. The second upper prong 732 may include a third arm 736A with a third finger 738A and a fourth arm 736B, spaced apart from the third arm 736A, with a fourth finger 738B. The third finger 738A may comprise a third curved portion and a third generally flat, locking portion. The fourth finger 738B may comprise a fourth curved portion and a fourth generally flat, locking portion. A second gap 740 may be positioned between the third and fourth arms 736A, 736B, thereby allowing the arms 736A, 736B to squeeze together and rebound so as to secure the second coupler 704 to the frame 602. Accordingly, to secure the second coupler 704 to the frame 602, a user may place the second upper prong 732 in the third aperture 632 and the second lower prong 716 in the fourth aperture 634.

As shown in FIGS. 12-15, in one embodiment, a modular frame system for glasses 800 (hereinafter referred to as the "system") includes a frame 802 with a first eye portion 804 on a first side 806 and a second eye portion 808 on a second side 810. Interposed between the first eye portion 804 and the second eye portion 808 may be a nasal bridge section 812 that couples the first eye portion 804 to the second eye portion 808. The frame 802 may be manufactured out of a plastic material (e.g., zyl or propionate), metal (e.g., aluminum, titanium, or steel), fiberglass, carbon fiber, wood, or any other material known in the art. A gap 814 may be positioned below the nasal bridge section 812 to receive a nose of a user. Proximate the gap 814 on the first eye portion 804 may be a first nose pad 816A and proximate the gap 814 on the second eye portion 808 may be a second nose pad 816B. The first and second nose pads 816A, 816B may protrude rearward toward the face of the user when positioned thereon. The first and second nose pads 816A, 816B may be manufactured and molded as a single unit with the frame 802. In other embodiments, the first and second nose pads 816A, 816B may be removably attachable and adjustable so as to adjust to a specific user's nose. Positioned in the first eye portion 804 may be a first lens 818A and the second eye portion 808 may be a second lens 818B. Both the first and second lenses 818A, 818B may include prescription lenses, sunglass lenses, or any other type of lens.

On a first lateral edge 820 of the first eye portion 804 may be a first mating section 822. The first mating section 822 may extend rearward and include a first aperture 824 and a second aperture 826. On a second lateral edge 828 of the second eye portion 808 may be a second mating section 830. The second mating section 830 may extend rearward and include a third aperture 832 and a fourth aperture 834. The first, second, third, and fourth apertures 824, 826, 832, and 834 may be different diameters or the same diameters.

Figure 14:
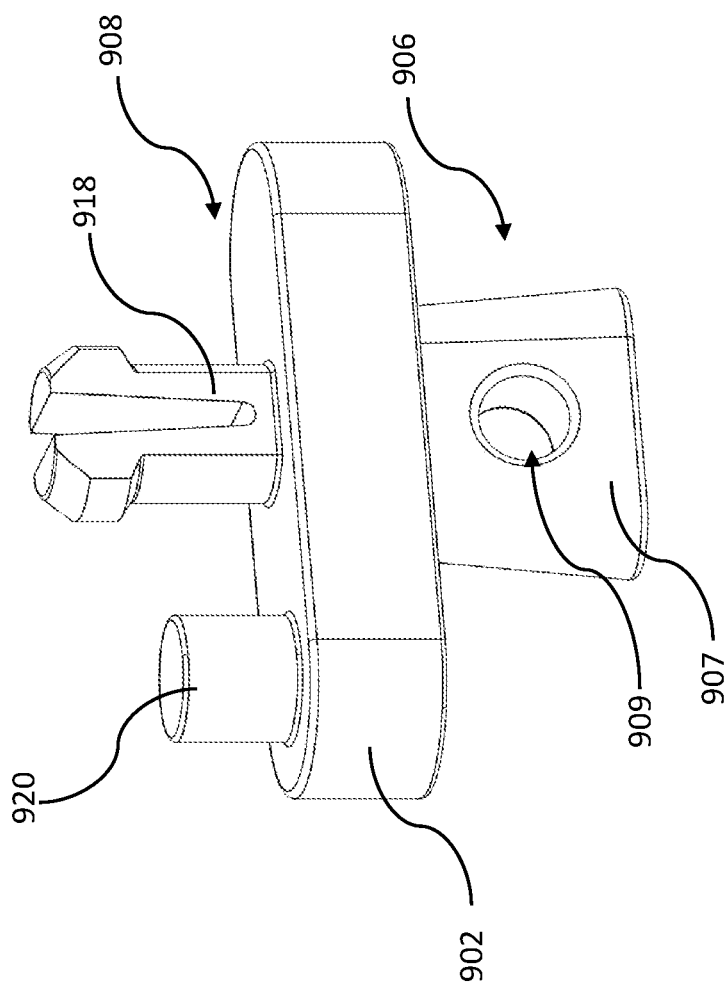
FIG. 14 illustrates a side perspective view of a coupling system of a modular frame system for glasses.
Figure 15:
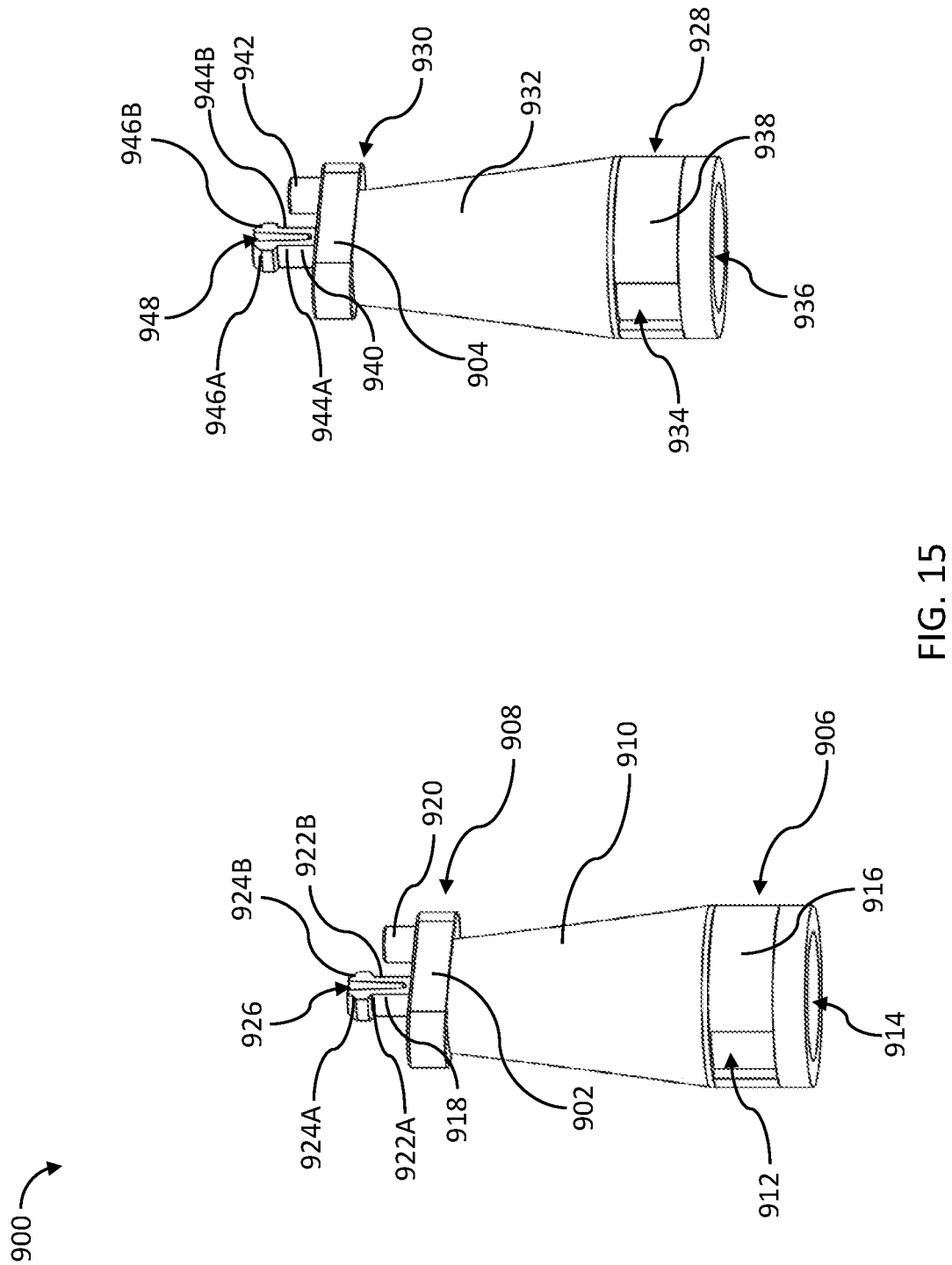
FIG. 15 illustrates a side perspective view of a coupling system of a modular frame system for glasses.
Figure 16:
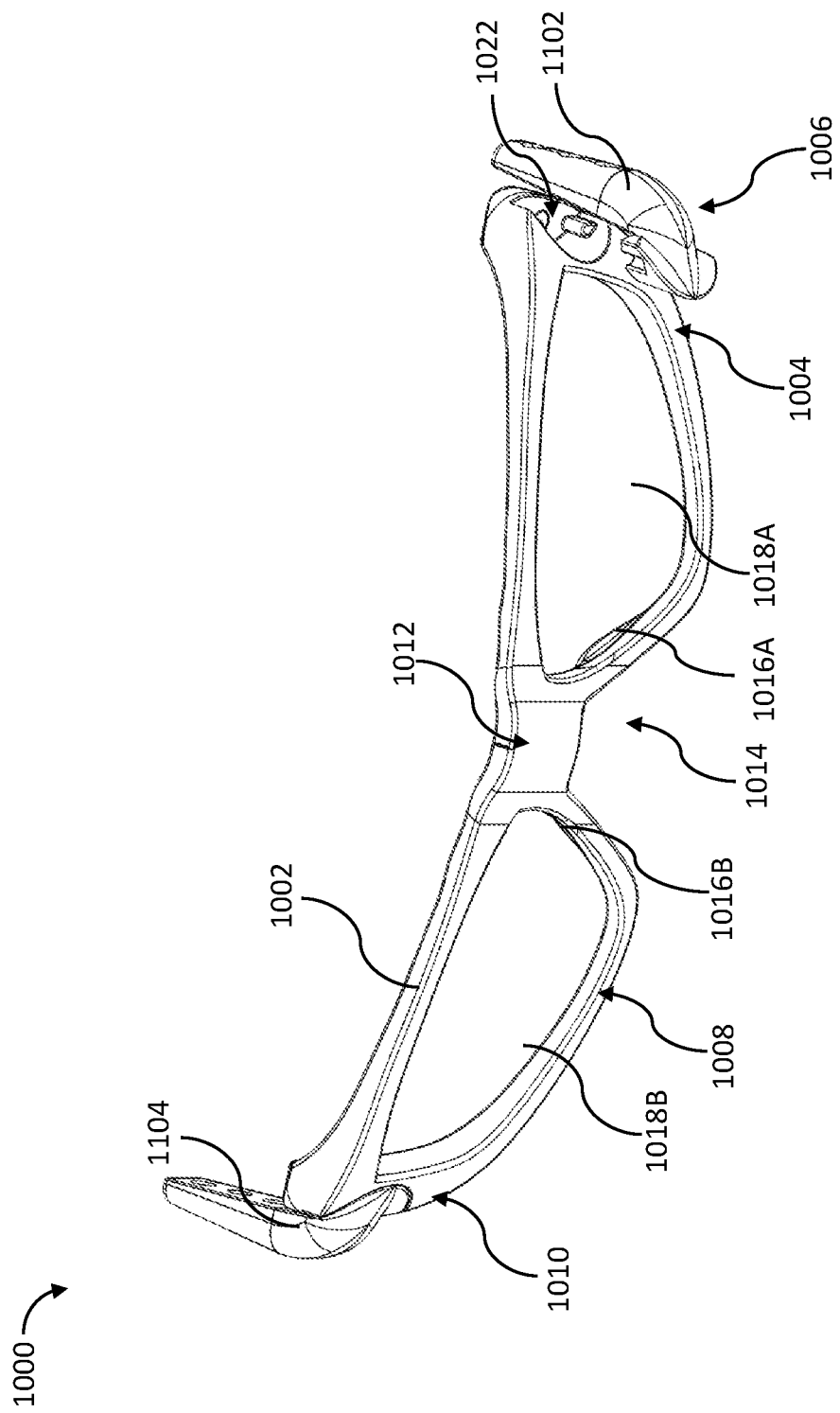
FIG. 16 illustrates a front, top perspective view of a frame of a modular frame system for glasses.
Figure 17:
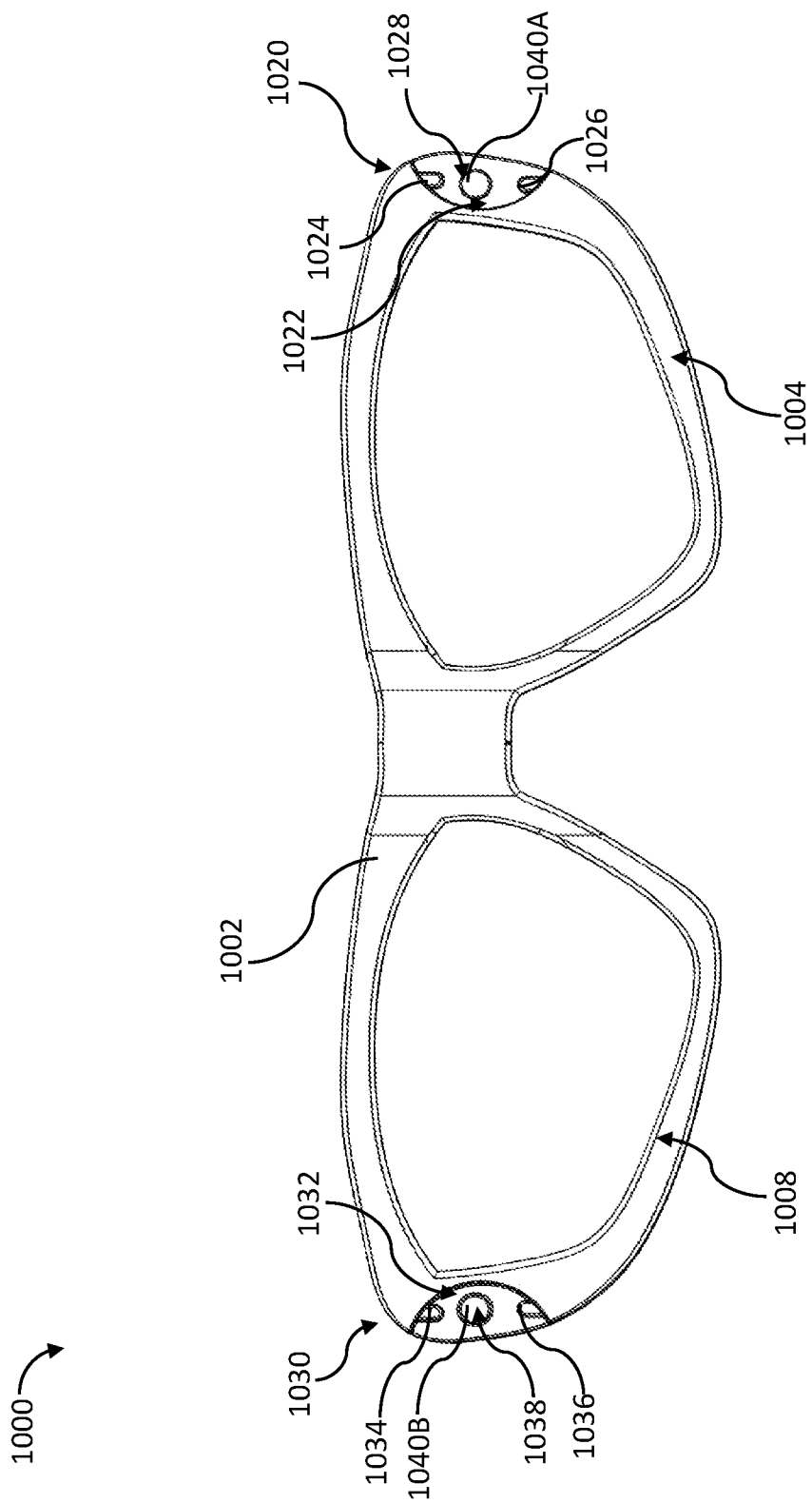
FIG. 17 illustrates a front elevation view of a frame of a modular frame system for glasses.

As shown in FIG. 14-15, the system 800 may further comprise a coupling system 900. The coupling system 900 may include a first coupler 902 and a second coupler 904 both of which may be coupled to the frame 802. The first coupler 902 may comprise a first portion 906 and a second portion 908. The first portion 906 may include a first member 907 with a first member aperture 909. The first member 907 may receive a first cone 910 with a first groove 912 on an outer surface thereof and a first aperture 914, or a headband directly. The first cone 910 may be secured to the first member 907 via snaps, adhesive, etc. The first aperture 914 may be configured to receive a headband, such as an elastic spiral band. That is, a first end of the headband may be inserted into the first aperture 914 and be secured therein. In particular, a first ring 916 (e.g., a malleable metal material) may wrap around the first groove 912 so that when the first end of the head band is placed in the first aperture 914, a user may squeeze the first cone 910 and the first ring 916, thereby securing the first end of the head band. In some embodiments, the headband may be secured in the cone via an adhesive or other securing mechanism. The second portion 908 may include a first upper prong 918 and a first lower prong 920, both of which are parallel to each other and spaced apart. The first upper prong 918 may include a first arm 922A with a first finger 924A and a second arm 922B, spaced apart from the first arm 922A, with a second finger 924B. The first finger 924A may comprise a first curved portion and a first locking portion. The second finger 924B may comprise a second curved portion and a second locking portion. A first gap 926 may be positioned between the first and second arms 922A, 922B, thereby allowing the arms 922A, 922B to squeeze together and rebound so as to secure the first coupler 902 to the frame 802. Accordingly, to secure the first coupler 902 to the frame 802, a user may place the first upper prong 918 in the first aperture 824 and the first lower prong 920 in the second aperture 826.

Similarly, the second coupler 904 may comprise a third portion 928 and a fourth portion 930. The third portion 928 may include a second member (not shown, similar to the first member) with a second member aperture. The second member may receive a second cone 932 with a second groove 934 on an outer surface thereof and a second aperture 936. The second cone 932 may be secured to the second member via snaps, adhesive, etc. The second aperture 936 may be configured to receive the headband. That is, a second end of the headband may be inserted into the second aperture 936 and be secured therein. In particular, a second ring 938 (e.g., a malleable metal material) may wrap around the second groove 934 so that when the second end of the head band is placed in the second aperture 936, a user may squeeze the second cone 932 and the second ring 938, thereby securing the second end of the head band. In some embodiments, the headband may be secured in the cone via an adhesive or other securing mechanism. The fourth portion 930 may include a second upper prong 940 and a second lower prong 942, both of which are parallel to each other and spaced apart. The second upper prong 940 may include a third arm 944A with a third finger 946A and a fourth arm 944B, spaced apart from the third arm 944A, with a fourth finger 946B. The third finger 946A may comprise a third curved portion and a third locking portion. The fourth finger 946B may comprise a fourth curved portion and a fourth locking portion. A second gap 948 may be positioned between the third and fourth arms 944A, 944B, thereby allowing the arms 944A, 944B to squeeze together and rebound so as to secure the second coupler 904 to the frame 802. Accordingly, to secure the second coupler 904 to the frame 802, a user may place the second upper prong 940 in the third aperture 832 and the second lower prong 942 in the fourth aperture 834.

As shown in FIGS. 16-19, in one embodiment, a modular frame system for glasses 1000 (hereinafter referred to as the "system") includes a frame 1002 with a first eye portion 1004 on a first side 1006 and a second eye portion 1008 on a second side 1010. Interposed between the first eye portion 1004 and the second eye portion 1008 may be a nasal bridge section 1012 that couples the first eye portion 1004 to the second eye portion 1008. The frame 1002 may be manufactured out of a plastic material (e.g., zyl or propionate), metal (e.g., aluminum, titanium, or steel), fiberglass, carbon fiber, wood, or any other material known in the art. A gap 1014 may be positioned below the nasal bridge section 1012 to receive a nose of a user. Proximate the gap 1014 on the first eye portion 1004 may be a first nose pad 1016A and proximate the gap 1014 on the second eye portion 1008 may be a second nose pad 1016B. The first and second nose pads 1016A, 1016B may protrude rearward toward the face of the user when positioned thereon. The first and second nose pads 1016A, 1016B may be manufactured and molded as a single unit with the frame 1002. In other embodiments, the first and second nose pads 1016A, 1016B may be removably attachable and adjustable so as to adjust to a specific user's nose. Positioned in the first eye portion 1004 may be a first lens 1018A and the second eye portion 1008 may be a second lens 1018B. Both the first and second lenses 1018A, 1018B may include prescription lenses, sunglass lenses, or any other type of lens.

On a first front edge 1020 of the first eye portion 1004 may be a first recession 1022. The first recession 1022 may be on a front of the frame 1002. The first recession 1022 may include a first protrusion 1024, a second protrusion 1026, and a first aperture 1028 interposed between the first protrusion 1024 and the second protrusion 1026. On a second front edge 1030 of the second eye portion 1008 may be a second recession 1032. The second recession 1032 may be on a front of the frame 1002. The second recession 1032 may include a third protrusion 1034, a fourth protrusion 1036, and a second aperture 1038 interposed between the third protrusion 1034 and the fourth protrusion 1036. The first and second recessions 1022, 1032 may both be generally u-shaped. Furthermore, the first aperture 1028 and the second aperture 1038 may each receive a first magnet 1040A, 1040B or another type of fastening mechanism.

Figure 18:
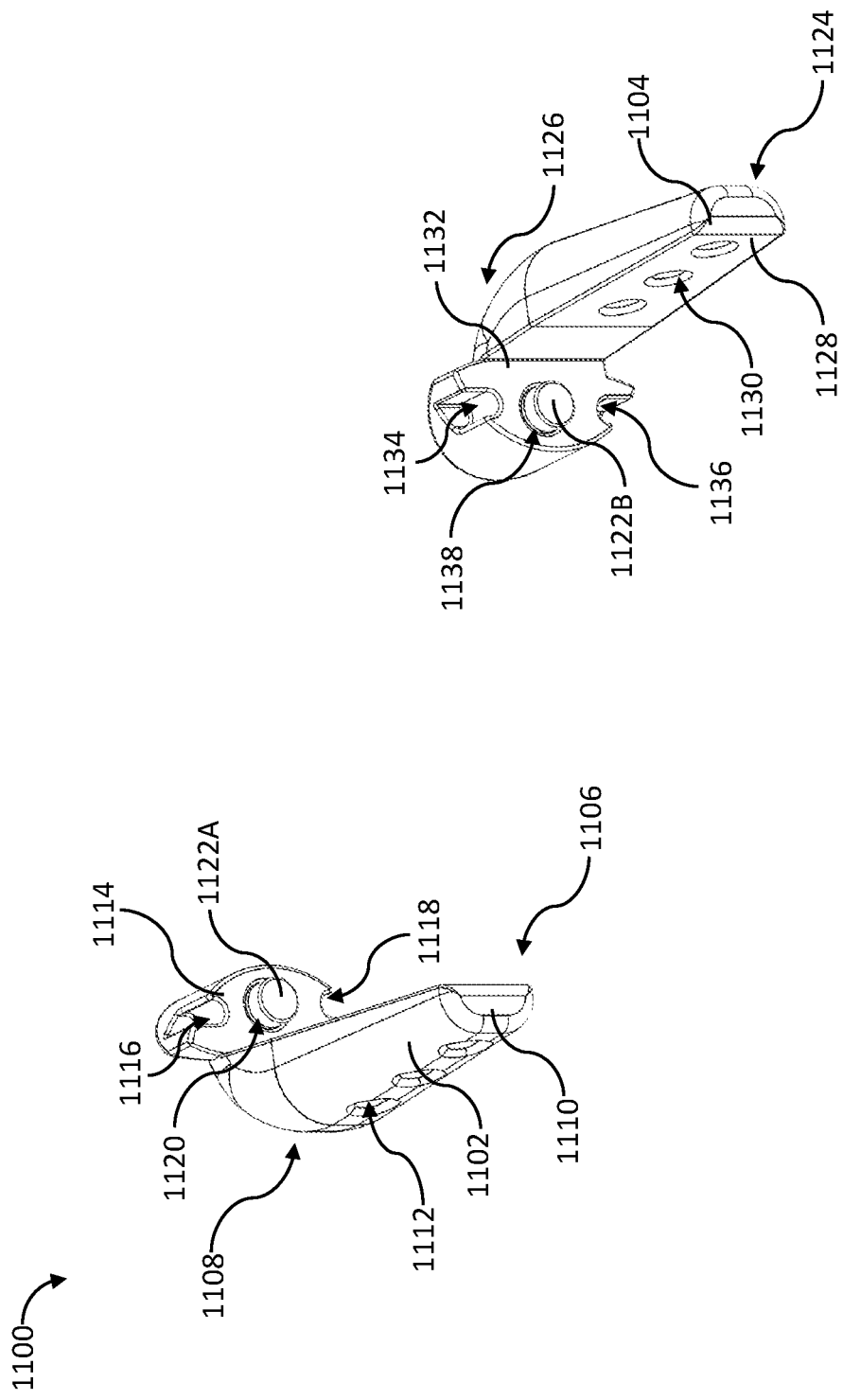
FIG. 18 illustrates a rear perspective view of a coupling system of a modular frame system for glasses.

As shown in FIG. 18, the system 1000 may further comprise a coupling system 1100. The coupling system 1100 may include a first coupler 1102 and a second coupler 1104 both of which may be coupled to the frame 1002. The first coupler 1102 may comprise a first portion 1106 and a second portion 1108. The first portion 1106 may include a first limb 1110 with a plurality of first coupler apertures 1112. The plurality of first coupler apertures 1112 may be configured to receive a headband, such as an elastic spiral band. That is, a first end of the headband may be inserted into any of the plurality of first coupler apertures 1112 and be secured therein. The second portion 1108 may include a first member 1114 that comprises a first top slot 1116, a first bottom slot 1118, and a first member aperture 1120 interposed between the first top slot 1116 and the first bottom slot 1118. The first member aperture 1120 may be configured to receive a second magnet 1122A or another type of fastening mechanism. To connect the first coupler 1102 to the frame 1002, a user may slide the first and second protrusions 1024, 1026 into the first top slot 1116 and first bottom slot 1118. The first and second magnets 1040A, 1122A may aid in alignment of the first coupler 1102 and aid in securement.

Similarly, the second coupler 1104 may comprise a third portion 1124 and a fourth portion 1126. The third portion 1124 may include a second limb 1128 with a plurality of second coupler apertures 1130. The plurality of second coupler apertures 1130 may be configured to receive the headband. That is, a second end of the headband may be inserted into any of the plurality of second coupler apertures 1130 and be secured therein (e.g., tying a knot). The fourth portion 1126 may include a second member 1132 that comprises a second top slot 1134, a second bottom slot 1136, and a second member aperture 1138 interposed between the second top slot 1134 and the second bottom slot 1136. The second member aperture 1138 may be configured to receive the second magnet 1122B or another type of fastening mechanism. To connect the second coupler 1104 to the frame 1002, a user may slide the third and fourth protrusions 1034, 1036 into the second top slot 1134 and the second bottom slot 1136. The first and second magnets 1040B, 1122B may aid in alignment of the second coupler 1104 and aid in securement.

Figure 19:
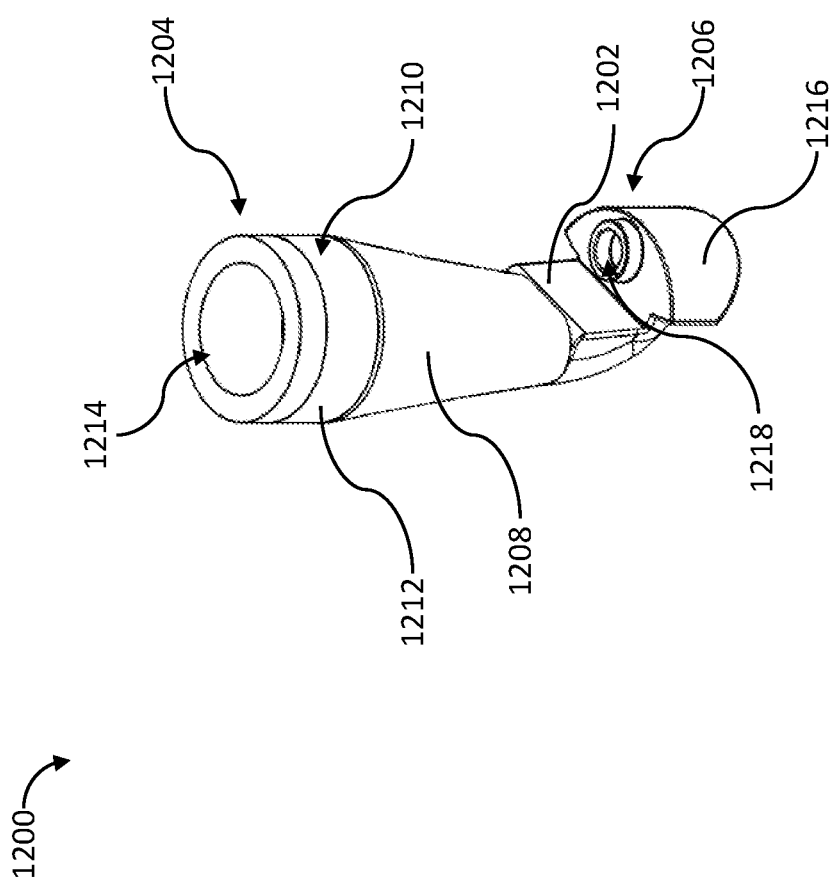
FIG. 19 illustrates a rear, side perspective view of a coupling system of a modular frame system for glasses.

In one embodiment, as shown in FIG. 19, a coupling system 1200 comprises a coupler 1202 with a first portion 1204 and a second portion 1206. The first portion 1204 may comprise a cone 1208 with a groove 1210 and a malleable ring 1212 positioned in the groove 1210 (similar to the embodiment described hereinabove). The cone 1208 may be configured to receive a headband via a cone aperture 1214. The second portion 1206 may comprise a first member 1216 that include a first protrusion aperture 1218 capable of receiving a magnet or other fastening mechanism.

In some embodiments, the coupling systems may receive and secure the headbands via set screws, adhesive, hook and loop, or any other type of securement method whether permanent or removably attachable.

Figure 20:
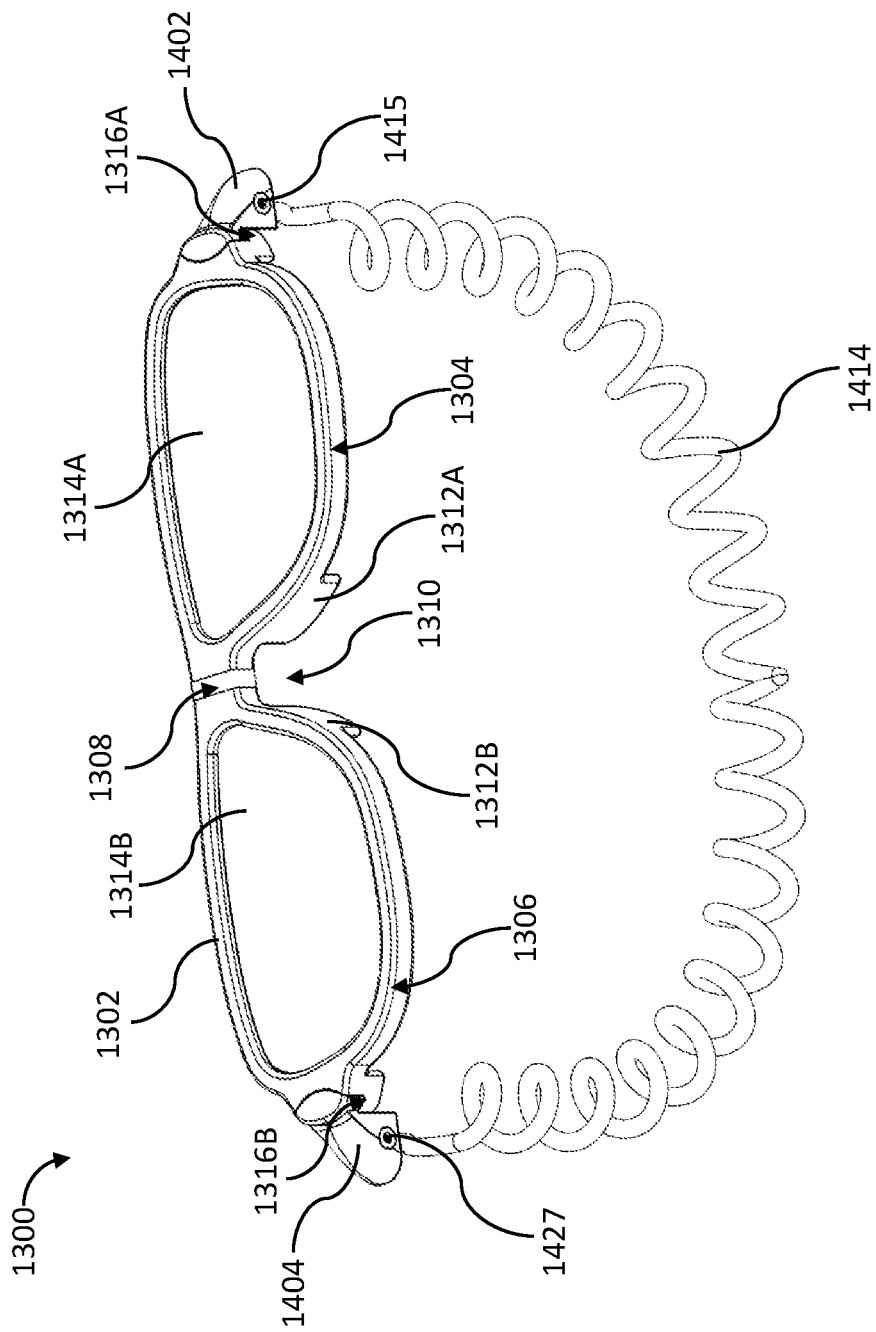
FIG. 20 illustrates a bottom, front perspective view of a modular frame system for glasses.
Figure 21:
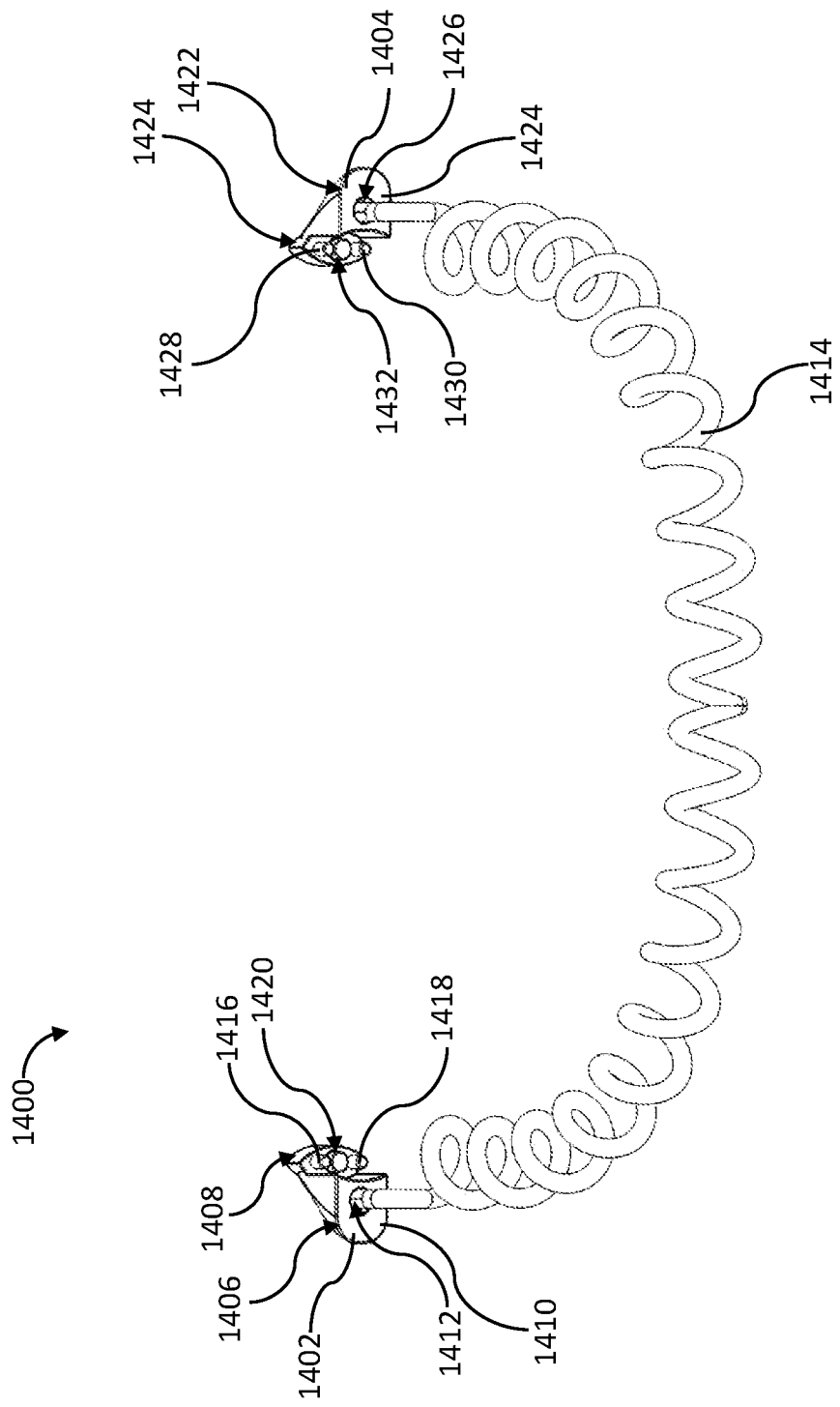
FIG. 21 illustrates a rear perspective view of a coupling system of a modular frame system for glasses.

As shown in FIGS. 20-21, in one embodiment, a modular frame system for glasses 1300 (hereinafter referred to as the "system") includes a frame 1302 with a first eye portion 1304 on a first side and a second eye portion 1306 on a second side. Interposed between the first eye portion 1304 and the second eye portion 1306 may be a nasal bridge section 1308 that couples the first eye portion 1304 to the second eye portion 1306. The frame 1302 may be manufactured out of a plastic material (e.g., zyl or propionate), metal (e.g., aluminum, titanium, or steel), fiberglass, carbon fiber, wood, or any other material known in the art. A gap 1310 may be positioned below the nasal bridge section 1308 to receive a nose of a user. Proximate the gap 1310 on the first eye portion 1304 may be a first nose pad 1312A and proximate the gap 1310 on the second eye portion 1306 may be a second nose pad 1312B. The first and second nose pads 1312A, 1312B may protrude rearward toward the face of the user when positioned thereon. The first and second nose pads 1312A, 1312B may be manufactured and molded as a single unit with the frame 1302. In other embodiments, the first and second nose pads 1312A, 1312B may be removably attachable and adjustable so as to adjust to a specific user's nose. Positioned in the first eye portion 1304 may be a first lens 1314A and the second eye portion 1306 may be a second lens 1314B. Both the first and second lenses 1314A, 1314B may include prescription lenses, sunglass lenses, or any other type of lens.

As shown in FIG. 20, on a first lateral edge of the first eye portion 1304 may be a first mating section 1316A. The first mating section 1316A may be on a front surface of the frame 1302 and include a first aperture, a second aperture, and a third aperture (Not shown). In some embodiments, the apertures may be the same sizes or different sizes. On a second lateral edge of the second eye portion 1306 may be a second mating section 1316B. The second mating section 1316B may be on the front surface of the frame 1302 and include a fourth aperture, a fifth aperture, and a sixth aperture (Not shown). In some embodiments, the apertures may be the same sizes or different sizes.

As shown in FIG. 20-21, the system 1300 may further comprise a coupling system 1400. The coupling system 1400 may include a first coupler 1402 and a second coupler 1404 both of which may be coupled to the frame 1302. The first coupler 1402 may comprise a first portion 1406 and a second portion 1408. The first portion 1406 may include a first limb 1410 with a first aperture 1412. The first aperture 1412 may be configured to receive a headband 1414, such as an elastic spiral band. That is, a first end of the headband 1414 may be inserted into the first aperture 1412 and be secured therein. The headband 1414 may be secured via a first fastener 1415 on a lower surface of the first portion 1406. The first fastener 1415 may include, for example, a set screw. The second portion 1408 may include a first upper prong 1416 and a first lower prong 1418, both of which are parallel to each other and spaced apart, with a first recession 1420 interposed between the first upper prong 1416 and the first lower prong 1418. The first recession 1420 may receive a magnet or another type of fastening device. To secure the first coupler 1402 to the frame 1302, a user may place the first upper prong 1416 in the first aperture on the first mating section 1316A and the first lower prong 1418 in the third aperture on the first mating section 1316A, with the magnet mating with or interacting with the second aperture (that may also include a magnet or other fastening device) on the first mating section 1316A. Accordingly, the first coupler 1402 may be removably attachable to the frame 1302.

Similarly, the second coupler 1404 may comprise a third portion 1422 and a fourth portion 1424. The third portion 1422 may include a second limb 1424 with a second aperture 1426. The second aperture 1426 may be configured to receive the headband 1414. That is, a second end of the headband 1414 may be inserted into the second aperture 1426 and be secured therein. The headband 1414 may be secured via a second fastener 1427 on a lower surface of the third portion 1422. The second fastener 1427 may include, for example, a set screw. The fourth portion 1424 may include a second upper prong 1428 and a second lower prong 1430, both of which are parallel to each other and spaced apart, with a second recession 1432 interposed between the second upper prong 1428 and the second lower prong 1430. The second recession 1432 may receive a magnet or another type of fastening device. To secure the second coupler 1404 to the frame 1302, a user may place the second upper prong 1428 in the fourth aperture on the second mating section 1316B and the second lower prong 1430 in the sixth aperture on the second mating section 1316B, with the magnet mating with or interacting with the fifth aperture (that may also include a magnet or other fastening device) on the second mating section 1316B. Accordingly, the second coupler 1404 may be removably attachable to the frame 1302.

Figure 22:
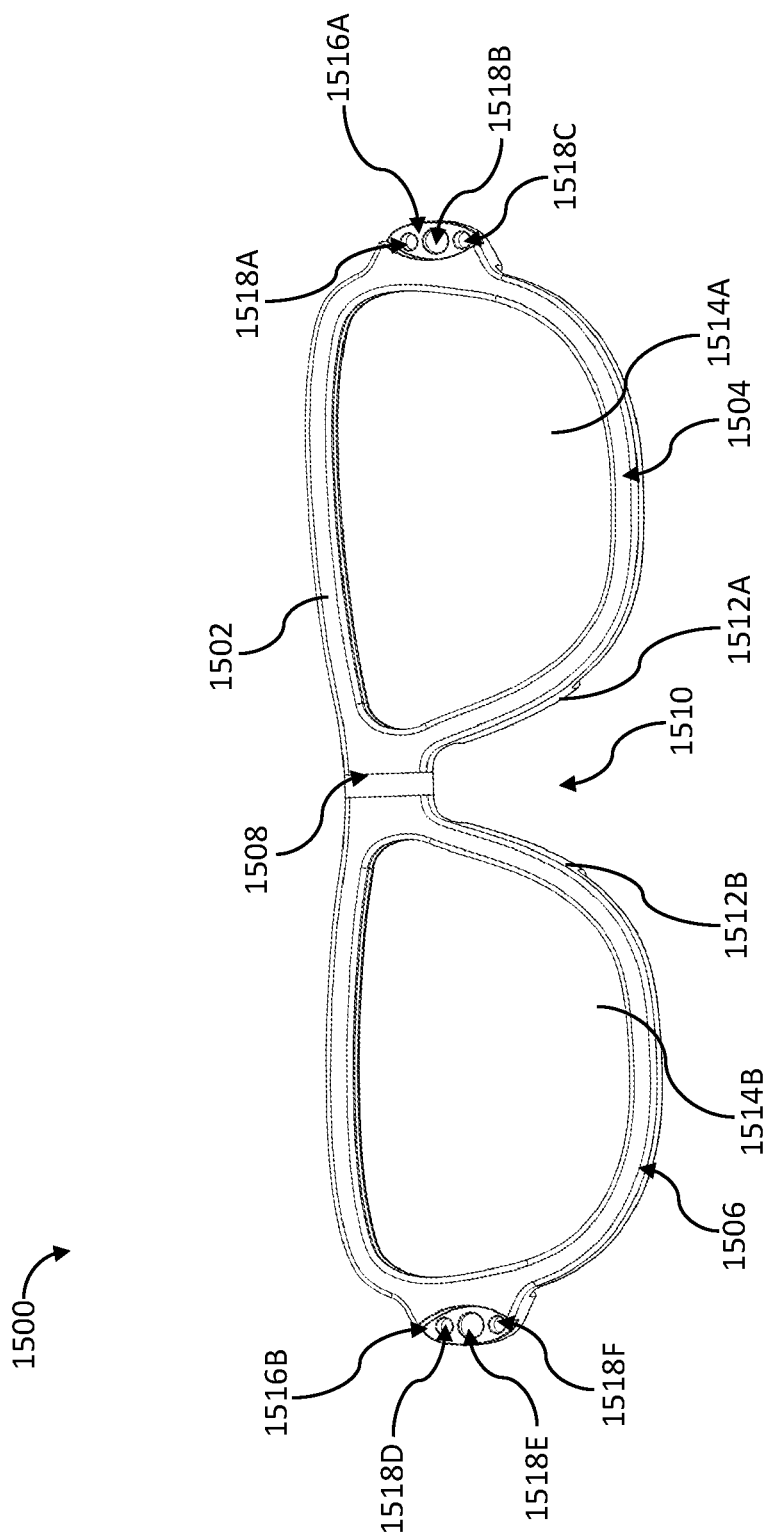
FIG. 22 illustrates a front perspective view of a modular frame system for glasses.
Figure 23:
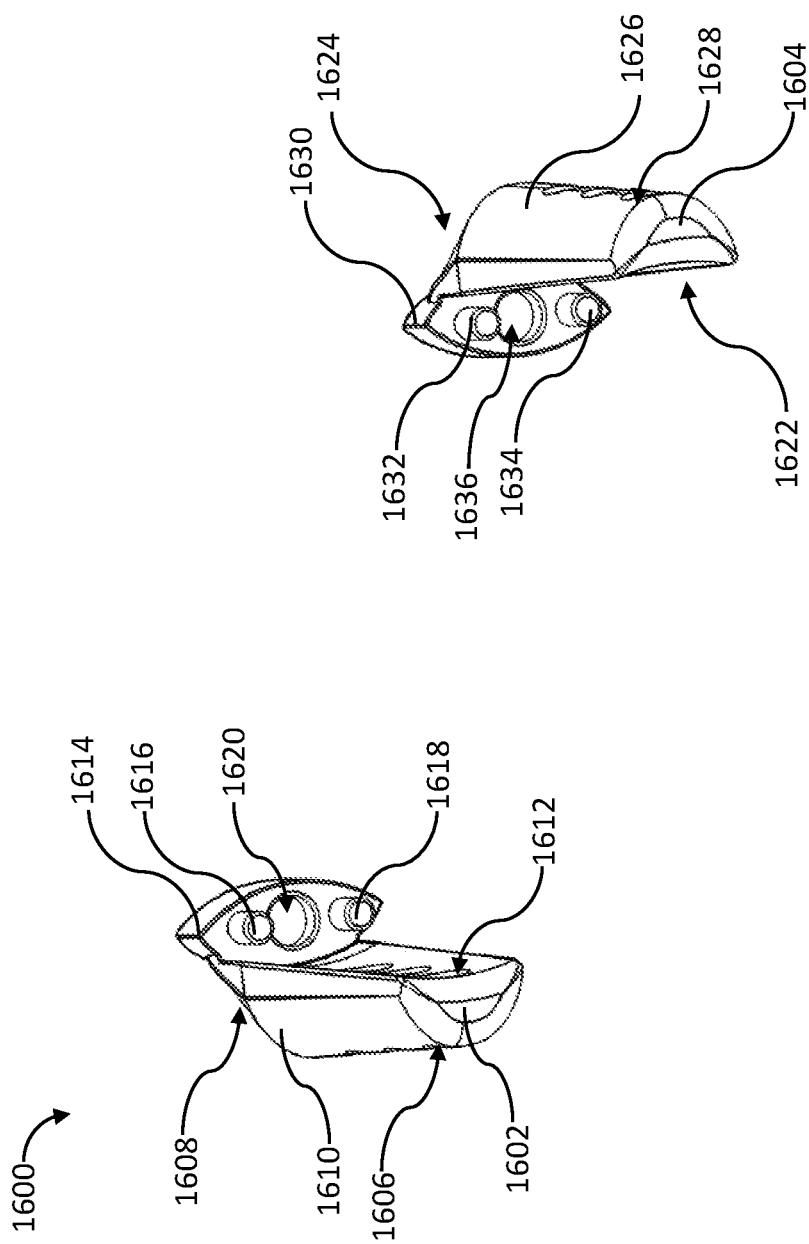
FIG. 23 illustrates a rear perspective view of a coupling system of a modular frame system for glasses.

As shown in FIGS. 22-23, in one embodiment, a modular frame system for glasses 1500 (hereinafter referred to as the "system") includes a frame 1502 with a first eye portion 1504 on a first side and a second eye portion 1506 on a second side. Interposed between the first eye portion 1504 and the second eye portion 1506 may be a nasal bridge section 1508 that couples the first eye portion 1504 to the second eye portion 1506. The frame 1502 may be manufactured out of a plastic material (e.g., zyl or propionate), metal (e.g., aluminum, titanium, or steel), fiberglass, carbon fiber, wood, or any other material known in the art. A gap 1510 may be positioned below the nasal bridge section 1508 to receive a nose of a user. Proximate the gap 1510 on the first eye portion 1504 may be a first nose pad 1512A and proximate the gap 1510 on the second eye portion 1506 may be a second nose pad 1512B. The first and second nose pads 1512A, 1512B may protrude rearward toward the face of the user when positioned thereon. The first and second nose pads 1512A, 1512B may be manufactured and molded as a single unit with the frame 1502. In other embodiments, the first and second nose pads 1512A, 1512B may be removably attachable and adjustable so as to adjust to a specific user's nose. Positioned in the first eye portion 1504 may be a first lens 1514A and the second eye portion 1506 may be a second lens 1514B. Both the first and second lenses 1514A, 1514B may include prescription lenses, sunglass lenses, or any other type of lens.

On a first lateral edge of the first eye portion 1504 may be a first mating section 1516A. The first mating section 1516A may be on a front surface of the frame 1502 and include a first aperture 1518A, a second aperture 1518B, and a third aperture 1518C. In some embodiments, the apertures 1518A, 1518B, 1518C may be the same sizes or different sizes. On a second lateral edge of the second eye portion 1506 may be a second mating section 1516B. The second mating section 1516B may be on the front surface of the frame 1502 and include a fourth aperture 1518D, a fifth aperture 1518E, and a sixth aperture 1518F. In some embodiments, the apertures 1518D, 1518E, 1518F may be the same sizes or different sizes.

As shown in FIG. 23, the system 1500 may further comprise a coupling system 1600. The coupling system 1600 may include a first coupler 1602 and a second coupler 1604 both of which may be coupled to the frame 1502. The first coupler 1602 may comprise a first portion 1606 and a second portion 1608. The first portion 1606 may include a first limb 1610 with a plurality of first coupler apertures 1612. The plurality of first coupler apertures 1612 may be configured to receive a headband, such as an elastic spiral band. That is, a first end of the headband may be inserted into any of the plurality of first coupler apertures 1612 and be secured therein. The second portion 1608 may include a first member 1614 that comprises a first top protrusion 1616, a first bottom protrusion 1618, and a first member aperture 1620 interposed between the first top protrusion 1616 and the first bottom protrusion 1618. The first member aperture 1620 may be configured to receive a magnet or another type of fastening mechanism. To connect the first coupler 1602 to the frame 1502, a user may slide the first top and first bottom protrusions 1616, 1618 into the first aperture 1518A and the third aperture 1518C on the first mating section 1516A, respectively. Magnets positioned in the second aperture 1518B on the first mating section 1516A and the first member aperture 1620 may engage one another and aid in alignment.

Similarly, the second coupler 1604 may comprise a third portion 1622 and a fourth portion 1624. The third portion 1622 may include a second limb 1626 with a plurality of second coupler apertures 1628. The plurality of second coupler apertures 1628 may be configured to receive the headband. That is, a second end of the headband may be inserted into any of the plurality of second coupler apertures 1628 and be secured therein. The fourth portion 1624 may include a second member 1630 that comprises a second top protrusion 1632, a second bottom protrusion 1634, and a second member aperture 1636 interposed between the second top protrusion 1632 and the second bottom protrusion 1634. The second member aperture 1636 may be configured to receive a magnet or another type of fastening. To connect the second coupler 1604 to the frame 1502, a user may slide the second top and second bottom protrusions 1632, 1634 into the fourth aperture 1518D and the sixth aperture 1518F on the second mating section 1516B, respectively. Magnets positioned in the fifth aperture 1518E on the second mating section 1516D and the second member aperture 1636 may engage one another and aid in alignment.

Figure 24:
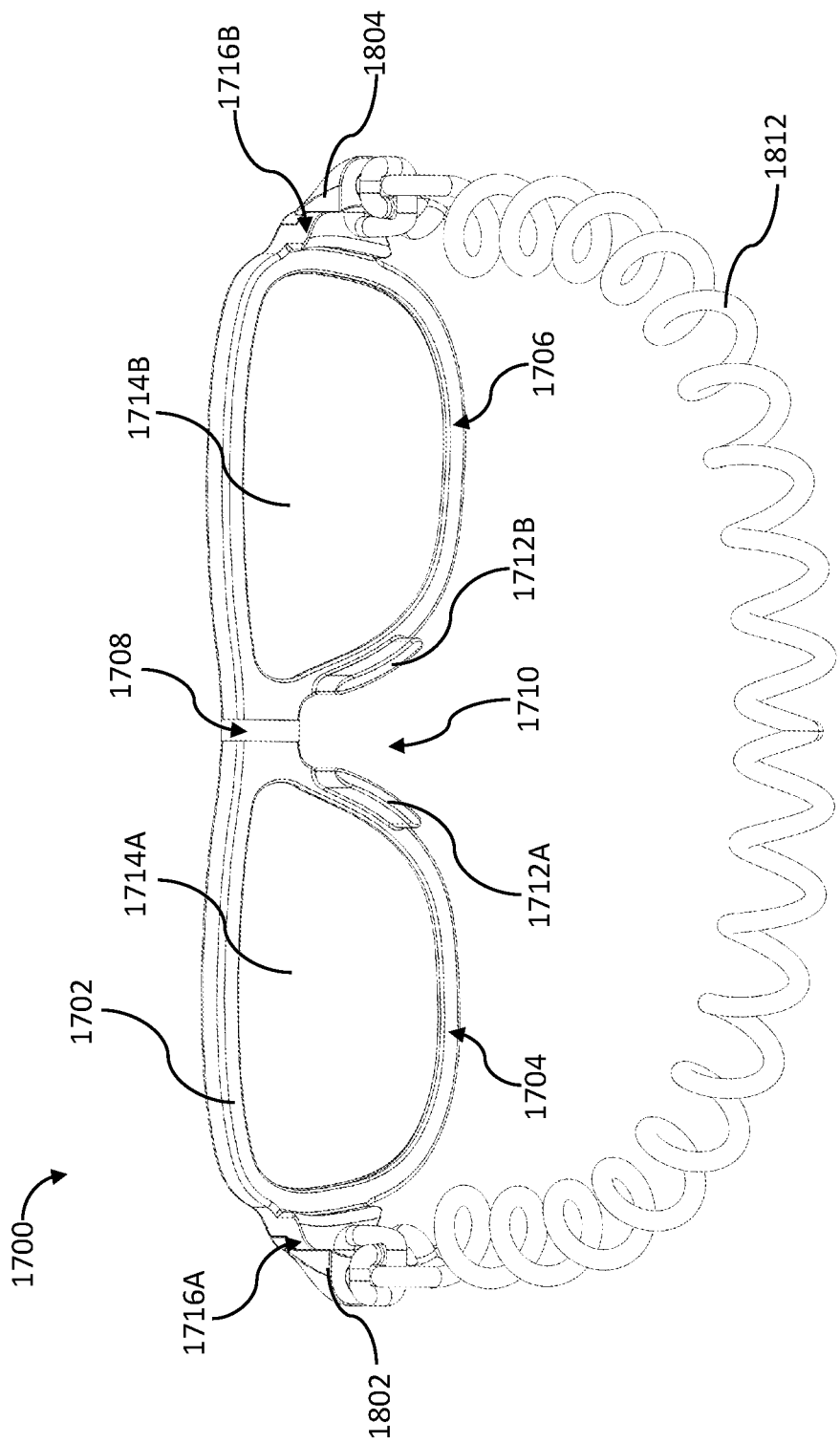
FIG. 24 illustrates a rear, top perspective view of a modular frame system for glasses.
Figure 25:
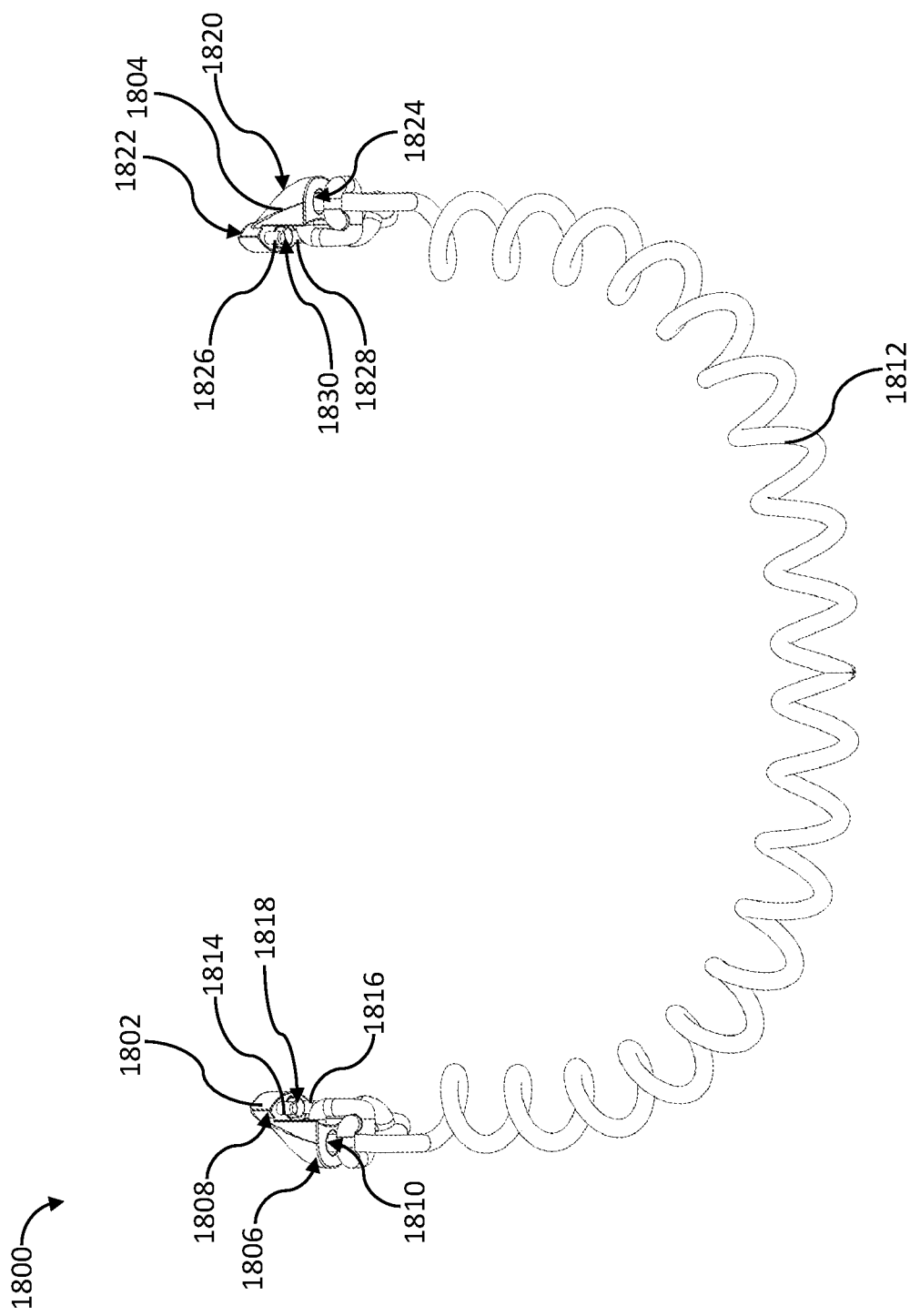
FIG. 25 illustrates a rear, top perspective view of a coupling system of a modular frame system for glasses.

As shown in FIGS. 24-25, in one embodiment, a modular frame system for glasses 1700 (hereinafter referred to as the "system") includes a frame 1702 with a first eye portion 1704 on a first side and a second eye portion 1706 on a second side. Interposed between the first eye portion 1704 and the second eye portion 1706 may be a nasal bridge section 1708 that couples the first eye portion 1704 to the second eye portion 1706. The frame 1702 may be manufactured out of a plastic material (e.g., zyl or propionate), metal (e.g., aluminum, titanium, or steel), fiberglass, carbon fiber, wood, or any other material known in the art. A gap 1710 may be positioned below the nasal bridge section 1708 to receive a nose of a user. Proximate the gap 1710 on the first eye portion 1704 may be a first nose pad 1712A and proximate the gap 1710 on the second eye portion 1706 may be a second nose pad 1712B. The first and second nose pads 1712A, 1712B may protrude rearward toward the face of the user when positioned thereon. The first and second nose pads 1712A, 1712B may be manufactured and molded as a single unit with the frame 1702. In other embodiments, the first and second nose pads 1712A, 1712B may be removably attachable and adjustable so as to adjust to a specific user's nose. Positioned in the first eye portion 1704 may be a first lens 1714A and the second eye portion 1706 may be a second lens 1714B. Both the first and second lenses 1714A, 1714B may include prescription lenses, sunglass lenses, or any other type of lens.

As shown in FIG. 24, on a first lateral edge of the first eye portion 1704 may be a first mating section 1716A. The first mating section 1716A may be on a front surface of the frame 1702 and include a first aperture, a second aperture, and a third aperture (Not shown). In some embodiments, the apertures may be the same sizes or different sizes. On a second lateral edge of the second eye portion 1706 may be a second mating section 1716B. The second mating section 1716B may be on the front surface of the frame 1702 and include a fourth aperture, a fifth aperture, and a sixth aperture (Not shown). In some embodiments, the apertures may be the same sizes or different sizes.

As shown in FIG. 25, the system 1700 may further comprise a coupling system 1800. The coupling system 1800 may include a first coupler 1802 and a second coupler 1804 both of which may be coupled to the frame 1702. The first coupler 1802 may comprise a first portion 1806 and a second portion 1808. The first portion 1806 may include a first aperture 1810. The first aperture 1810 may be configured to receive a headband 1812, such as an elastic spiral band. That is, a first end of the headband 1812 may be inserted into the first aperture 1810, through another aperture on a lower surface of the first portion 1806, and be secured therein. The headband 1812 may be secured by tying a knot around the first portion 1806. The second portion 1808 may include a first upper prong 1814 and a first lower prong 1816, both of which are parallel to each other and spaced apart, with a first recession 1818 interposed between the first upper prong 1814 and the first lower prong 1816. The first recession 1818 may receive a magnet or another type of fastening device. To secure the first coupler 1802 to the frame 1702, a user may place the first upper prong 1814 in the first aperture on the first mating section 1716A and the first lower prong 1816 in the third aperture on the first mating section 1716A, with the magnet mating with or interacting with the second aperture (that may also include a magnet or other fastening device) on the first mating section 1716A. Accordingly, the first coupler 1802 may be removably attachable to the frame 1702.

Similarly, the second coupler 1804 may comprise a third portion 1820 and a fourth portion 1822. The third portion 1820 may include a second aperture 1824. The second aperture 1824 may be configured to receive the headband 1812. That is, a second end of the headband 1812 may be inserted into any of the second aperture 1824, through another aperture on a lower surface of the third portion 1820, and be secured therein. The headband 1812 may be secured by tying a knot around the third portion 1820. The fourth portion 1822 may include a second upper prong 1826 and a second lower prong 1828, both of which are parallel to each other and spaced apart, with a second recession 1830 interposed between the second upper prong 1826 and the second lower prong 1828. The second recession 1830 may receive a magnet or another type of fastening device. To secure the second coupler 1804 to the frame 1702, a user may place the second upper prong 1826 in the fourth aperture on the second mating section 1716B and the second lower prong 1828 in the sixth aperture on the second mating section 1716B, with the magnet mating with or interacting with the fifth aperture (that may also include a magnet or other fastening device) on the second mating section 1716B. Accordingly, the second coupler 1804 may be removably attachable to the frame 1702.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A modular frame system for glasses comprising:
    a frame with a first eye portion on a first side and a second eye portion on a second side;

a nasal bridge section that couples to and is interposed between the first eye portion and the second eye portion;
a gap positioned below the nasal bridge section;
a first nose pad on the first eye portion proximate the gap;
a second nose pad on the second eye portion proximate the gap;
a first lens in the first eye portion;
a second lens in the second eye portion;
a first protrusion that extends rearward on a first lateral edge of the first eye portion;
a second protrusion that extends rearward on a second lateral edge of the second eye portion; and
a coupling system that fastens to the first protrusion and the second protrusion, wherein the coupling system comprises a first coupler with a first portion and a second portion, the first portion consists of at least one of a first shaft with a first coupler aperture; a first loop with a first aperture; or a first portion protrusion with a first protrusion aperture, a second portion protrusion with a second protrusion aperture, and a first protrusion channel therein between.

2. The modular frame system for glasses of claim 1, wherein the first protrusion comprises a first slot that contacts and interacts with a first channel opened on an inner surface of the first protrusion.

3. The modular frame system for glasses of claim 1, wherein the first protrusion comprises a first aperture on an outer surface of the first protrusion, the first aperture passing to a first channel.

4. The modular frame system for glasses of claim 1, wherein the second protrusion comprises a second slot that contacts and interacts with a second channel opened on an inner surface of the second protrusion.

5. The modular frame system for glasses of claim 1, wherein the second protrusion comprises a second aperture on an outer surface of the second protrusion, the second aperture passing to a second channel.

6. The modular frame system for glasses of claim 1, wherein the coupling system comprises a second coupler with a third portion and a fourth portion.

7. The modular frame system for glasses of claim 6, wherein the third portion consists of at least one of a second shaft with a second coupler aperture; a second loop with a second aperture; or a third portion protrusion with a third protrusion aperture, a fourth portion protrusion with a fourth protrusion aperture, and a second protrusion channel therein between.

8. The modular frame system for glasses of claim 6, wherein the fourth portion comprises one or more second prongs.

9. The modular frame system for glasses of claim 6, wherein the fourth portion of the second coupler is positioned in and secured in the second protrusion on the second eye portion.

10. The modular frame system for glasses of claim 1, wherein the second portion comprises one or more first prongs.

11. The modular frame system for glasses of claim 1, wherein the second portion of the first coupler is positioned in and secured in the first protrusion on the first eye portion.

12. The modular frame system for glasses of claim 1, further comprising a depressor apparatus to release the coupling system from the frame.

13. A modular frame system for glasses comprising:
a frame with a first eye portion on a first side and a second eye portion on a second side;
a nasal bridge section that couples to and is interposed between the first eye portion and the second eye portion;
a gap positioned below the nasal bridge section;
a first nose pad on the first eye portion proximate the gap;
a second nose pad on the second eye portion proximate the gap;
a first lens in the first eye portion;
a second lens in the second eye portion;
a first protrusion that extends rearward on a first lateral edge of the first eye portion, the first protrusion comprising:
a first slot that leads to and interacts with a first channel opened on an inner surface of the first protrusion; and
a first aperture on an outer side of the first protrusion, the first aperture passing to the first channel;
a second protrusion that extends rearward on a second lateral edge of the second eye portion, the second protrusion comprising:
a second slot that leads to and interacts with a second channel opened on an inner surface of the second protrusion; and
a second aperture on an outer side of the second protrusion, the second aperture passing to the second channel; and
a coupling system comprising a first coupler and a second coupler.

14. The modular frame system for glasses of claim 13, wherein the first coupler comprises a first portion and a second portion, and the second coupler comprises a third portion and a fourth portion.

15. The modular frame system for glasses of claim 14, wherein the second portion comprises a first upper prong, a first middle prong, and a first lower prong.

16. The modular frame system for glasses of claim 14, wherein the fourth portion comprises a second upper prong, a second middle prong, and a second lower prong.

17. The modular frame system for glasses of claim 13, wherein the first coupler is removably attachable to the first protrusion, and the second coupler is removably attachable to the second protrusion.

18. A modular frame system for glasses comprising:
a frame with a first eye portion on a first side and a second eye portion on a second side;
a nasal bridge section that couples to and is interposed between the first eye portion and the second eye portion;
a gap positioned below the nasal bridge section;
a first lens in the first eye portion;
a second lens in the second eye portion;
a first protrusion that extends rearward on a first lateral edge of the first eye portion, the first protrusion comprising:
a first slot that leads to and interacts with a first channel opened on an inner surface of the first protrusion; and
a first aperture on an outer side of the first protrusion, the first aperture passing to the first channel;
a second protrusion that extends rearward on a second lateral edge of the second eye portion, the second protrusion comprising:
a second slot that leads to and interacts with a second channel opened on an inner surface of the second protrusion; and a second aperture on an outer side of the second protrusion, the second aperture passing to the second channel;

a coupling system comprising a first coupler that is removably attachable to the first protrusion and a second coupler that is removably attachable to the second protrusion;

the first coupler comprising a first portion and a second portion, the second portion comprising one or more first prongs that are positionable into the first slot;

the second coupler comprising a third portion and a fourth portion, the fourth portion comprising one or more second prongs that are positionable into the second slot;

wherein the one or more first prongs comprise a first finger that is inserted into the first aperture to secure the first coupler to the first protrusion, and the one or more second prongs comprise a second finger that is inserted into the second aperture to secure the second coupler to the second protrusion.

\* \* \* \* \*